US008244097B2

(12) United States Patent
Abe

(10) Patent No.: US 8,244,097 B2
(45) Date of Patent: Aug. 14, 2012

(54) INFORMATION PROCESSING APPARATUS, INFORMATION PROCESSING METHOD, AND COMPUTER PROGRAM

(75) Inventor: Fumiyoshi Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1538 days.

(21) Appl. No.: 11/492,897

(22) Filed: Jul. 26, 2006

(65) Prior Publication Data

US 2007/0031117 A1 Feb. 8, 2007

(30) Foreign Application Priority Data

Aug. 2, 2005 (JP) ................ P2005-223972

(51) Int. Cl.
*H04N 9/80* (2006.01)
*H04N 5/77* (2006.01)
*H04N 5/93* (2006.01)
*G11B 27/00* (2006.01)

(52) U.S. Cl. ........ 386/242; 386/239; 386/248; 386/224; 386/278; 386/286; 386/288

(58) Field of Classification Search .............. 386/46, 386/52, 55, 95, 224, 239–248, 278–290
See application file for complete search history.

(56) References Cited

U.S. PATENT DOCUMENTS

| 5,644,674 | A | * | 7/1997 | Aihara et al. | 386/52 |
| 7,711,241 | B2 | * | 5/2010 | Mori et al. | 386/285 |
| 7,983,528 | B2 | * | 7/2011 | Sohma et al. | 386/278 |
| 2003/0146915 | A1 | * | 8/2003 | Brook et al. | 345/473 |

FOREIGN PATENT DOCUMENTS

| JP | 2002-342740 | 11/2002 |
| JP | 2003-78868 | 3/2003 |
| JP | 2003-87815 | 3/2003 |
| JP | 2003-91734 | 3/2003 |
| JP | 2004-32277 | 1/2004 |
| JP | 2005-39734 | 2/2005 |

* cited by examiner

*Primary Examiner* — Thai Tran
*Assistant Examiner* — Hung Dang
(74) *Attorney, Agent, or Firm* — Oblon, Spivak, McClelland, Maier & Neustadt, L.L.P.

(57) ABSTRACT

An information processing apparatus includes an image input section configured to input an edit target image, an edit target image attribute input section configured to input attribute information of the edit target image, a display control section configured to display the edit target image displayed on a display screen, a user instruction input section configured to input an instruction from a user, a correction parameter acquisition section configured to acquire a correction parameter, an image editing section configured to edit the edit target image displayed on a display screen, an edited image attribute acquisition section configured to acquire attribute information, an edit information generation section configured to generate edit information, and an edit information storage section configured to store the edit information.

20 Claims, 24 Drawing Sheets

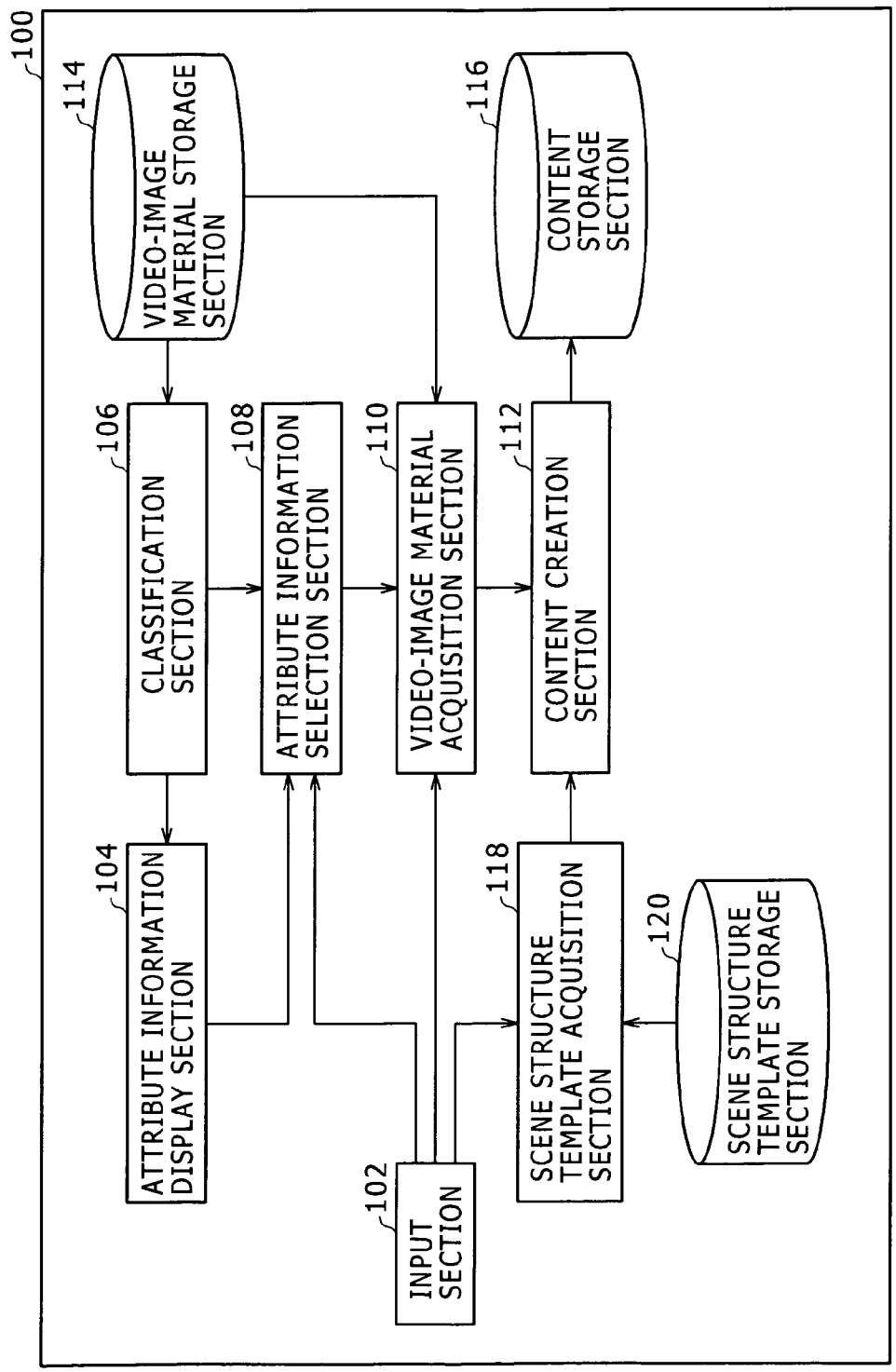

FIG. 2

| BASIC REQUIREMENTS | PURPOSE | PRODUCT SALES PROMOTION |
|---|---|---|
| | LENGTH | 5 MINUTES |
| | DATE OF DELIVERY | SUPERURGENT |
| | IMAGE QUALITY | SD HIGH IMAGE QUALITY DVW |
| | MANNER OF DELIVERY | DVD |
| | DESIRED PRICE | 1,000,000 |

202

| BASIC REQUIREMENTS | PURPOSE | PRODUCT SALES PROMOTION ▼ |
|---|---|---|
| | LENGTH | CUSTOMER ATTRACTION ▲ |
| | DATE OF DELIVERY | PRODUCT SALES PROMOTION |
| | IMAGE QUALITY | FACILITIES GUIDE |
| | MANNER OF DELIVERY | TRAVEL GUIDE |
| | DESIRED PRICE | SELF-INTRODUCTION |
| | | MANUAL ▼ |

| | | |
|---|---|---|
| SCENE 1 | AIM | OPENING |
| | VIDEO IMAGE | STILL IMAGE |
| | PRIMARY EFFECT 1 | TITLE 1 |
| | PRIMARY EFFECT 2 | CHROMAKEY COMPOSITE |
| | LENGTH | 15 SECONDS |
| | IMAGE QUALITY | SD MODERATE IMAGE QUALITY DSR300 |
| | NUMBER OF CONSTITUENT CUTS | 3 |
| | PART UNIT PRICE | |
| SCENE 2 | AIM | EARLY STAGE(INTRODUCTION) |
| | VIDEO IMAGE | SHOT IMAGE |
| | PRIMARY EFFECT 1 | NARRATION |
| | PRIMARY EFFECT 2 | TELOP |
| | LENGTH | 1 MINUTE |
| | IMAGE QUALITY | SD MODERATE IMAGE QUALITY DSR300 |
| | NUMBER OF CONSTITUENT CUTS | 4 |
| | PART UNIT PRICE | |
| SCENE 3 | AIM | MIDDLE STAGE(DEVELOPMENT) |
| | VIDEO IMAGE | SHOT IMAGE |
| | PRIMARY EFFECT 1 | BGM |
| | PRIMARY EFFECT 2 | TELOP |
| | LENGTH | 30 SECONDS |
| | IMAGE QUALITY | SD MODERATE IMAGE QUALITY DSR300 |
| | NUMBER OF CONSTITUENT CUTS | 6 |
| | PART UNIT PRICE | |
| SCENE 4 | AIM | MIDDLE STAGE(TURN) |
| | VIDEO IMAGE | READY-MADE MATERIAL 1 |
| | PRIMARY EFFECT 1 | BGM |
| | PRIMARY EFFECT 2 | CHROMAKEY COMPOSITE |
| | LENGTH | 30 SECONDS |
| | IMAGE QUALITY | SD MODERATE IMAGE QUALITY DSR300 |
| | NUMBER OF CONSTITUENT CUTS | 4 |
| | PART UNIT PRICE | |
| SCENE 5 | AIM | LATE STAGE(CONCLUSION) |
| | VIDEO IMAGE | SHOT IMAGE |
| | PRIMARY EFFECT 1 | NARRATION |
| | PRIMARY EFFECT 2 | NONE |
| | LENGTH | 1 MINUTE |
| | IMAGE QUALITY | SD MODERATE IMAGE QUALITY DSR300 |
| | NUMBER OF CONSTITUENT CUTS | 3 |
| | PART UNIT PRICE | |
| SCENE 6 | AIM | ENDING |
| | VIDEO IMAGE | SHOT IMAGE |
| | PRIMARY EFFECT 1 | NARRATION |
| | PRIMARY EFFECT 2 | BGM |
| | LENGTH | 30 SECONDS |
| | IMAGE QUALITY | SD MODERATE IMAGE QUALITY DSR300 |
| | NUMBER OF CONSTITUENT CUTS | 4 |
| | PART UNIT PRICE | |

FIG. 4

| | | |
|---|---|---|
| SCENE 1 | AIM | OPENING |
| | VIDEO IMAGE | OPENING |
| | PRIMARY EFFECT 1 | EARLY STAGE (INTRODUCTION) |
| | PRIMARY EFFECT 2 | MIDDLE STAGE (DEVELOPMENT) |
| | LENGTH | MIDDLE STAGE (TURN) |
| | IMAGE QUALITY | LATE STAGE (CONCLUSION) |
| | NUMBER OF CONSTITUENT CUTS | ENDING |
| | PART UNIT PRICE | |
| SCENE 2 | AIM | EARLY STAGE (INTRODUCTION) |
| | VIDEO IMAGE | SHOT IMAGE |
| | PRIMARY EFFECT 1 | NARRATION |
| | PRIMARY EFFECT 2 | TELOP |
| | LENGTH | 1 MINUTE |
| | IMAGE QUALITY | SD MODERATE IMAGE QUALITY DSR300 |
| | NUMBER OF CONSTITUENT CUTS | 4 |
| | PART UNIT PRICE | |
| SCENE 3 | AIM | MIDDLE STAGE (DEVELOPMENT) |
| | VIDEO IMAGE | SHOT IMAGE |
| | PRIMARY EFFECT 1 | BGM |
| | PRIMARY EFFECT 2 | TELOP |
| | LENGTH | 30 SECONDS |
| | IMAGE QUALITY | SD MODERATE IMAGE QUALITY DSR300 |
| | NUMBER OF CONSTITUENT CUTS | 6 |
| | PART UNIT PRICE | |
| SCENE 4 | AIM | MIDDLE STAGE (TURN) |
| | VIDEO IMAGE | READY-MADE MATERIAL 1 |
| | PRIMARY EFFECT 1 | BGM |
| | PRIMARY EFFECT 2 | CHROMAKEY COMPOSITE |
| | LENGTH | 30 SECONDS |
| | IMAGE QUALITY | SD MODERATE IMAGE QUALITY DSR300 |
| | NUMBER OF CONSTITUENT CUTS | 4 |
| | PART UNIT PRICE | |
| SCENE 5 | AIM | LATE STAGE (CONCLUSION) |
| | VIDEO IMAGE | SHOT IMAGE |
| | PRIMARY EFFECT 1 | NARRATION |
| | PRIMARY EFFECT 2 | NONE |
| | LENGTH | 1 MINUTE |
| | IMAGE QUALITY | SD MODERATE IMAGE QUALITY DSR300 |
| | NUMBER OF CONSTITUENT CUTS | 3 |
| | PART UNIT PRICE | |
| SCENE 6 | AIM | ENDING |
| | VIDEO IMAGE | SHOT IMAGE |
| | PRIMARY EFFECT 1 | NARRATION |
| | PRIMARY EFFECT 2 | BGM |
| | LENGTH | 30 SECONDS |
| | IMAGE QUALITY | SD MODERATE IMAGE QUALITY DSR300 |
| | NUMBER OF CONSTITUENT CUTS | 4 |
| | PART UNIT PRICE | |

| SCENE | AIM | ~210 |
| --- | --- | --- |
| | VIDEO IMAGE | ~211 |
| | PRIMARY EFFECT | ~212 |
| | LENGTH | ~213 |
| | IMAGE QUALITY | ~214 |
| | NUMBER OF CONSTITUENT CUTS | ~215 |
| | PART UNIT PRICE | ~216 |

| 210-1 |
| --- |
| OPENING |
| EARLY STAGE |
| MIDDLE STAGE |
| INTERESTING PART |
| DEVELOPMENT |
| LATE STAGE |
| ENDING |

| 211-1 |
| --- |
| NONE(MONOCHROME) |
| STILL IMAGE |
| CG1 |
| CG2 |
| SHOT IMAGE |
| READY-MADE MATERIAL 1 |
| READY-MADE MATERIAL 2 |
| CHROMAKEY COMPOSITE |
| SAMPLE 1 |
| SAMPLE 2 |
| SAMPLE 3 |

| 212-1 |
| --- |
| NONE |
| TITLE 1 |
| TITLE 2 |
| BGM |
| SOUND EFFECT |
| NARRATION |
| CHROMAKEY COMPOSITE |
| TELOP |

| 1 SECOND TO 30 MINUTES | ~213-1 |

| 214-1 |
| --- |
| COST PRIORITY PD150 |
| SD MODERATE IMAGE QUALITY DSR300 |
| SD HIGH IMAGE QUALITY DVW |
| HD LOW COST HDV |
| HD XDCAM-HD |
| SD HIGH IMAGE QUALITY HDCAM-SR |

| 1 TO 10 | ~215-1 |

| | | |
|---|---|---|
| CUT 1 | SUBJECT | OPENING |
| | VIDEO IMAGE | STILL IMAGE |
| | PRIMARY EFFECT 1 | TITLE 1 |
| | PRIMARY EFFECT 2 | CHROMAKEY COMPOSITE |
| | LENGTH | 7 SECONDS |
| | IMAGE QUALITY | SD MODERATE IMAGE QUALITY DSR300 |
| | PART UNIT PRICE | |
| CUT 2 | SUBJECT | OPENING |
| | VIDEO IMAGE | SHOT IMAGE |
| | PRIMARY EFFECT 1 | TITLE 1 |
| | PRIMARY EFFECT 2 | CHROMAKEY COMPOSITE |
| | LENGTH | 3 SECONDS |
| | IMAGE QUALITY | SD MODERATE IMAGE QUALITY DSR300 |
| | PART UNIT PRICE | |
| CUT 3 | SUBJECT | OPENING |
| | VIDEO IMAGE | SHOT IMAGE |
| | PRIMARY EFFECT 1 | TITLE 1 |
| | PRIMARY EFFECT 2 | CHROMAKEY COMPOSITE |
| | LENGTH | 5 SECONDS |
| | IMAGE QUALITY | SD MODERATE IMAGE QUALITY DSR300 |
| | PART UNIT PRICE | |

FIG. 7

| | | |
|---|---|---|
| CUT 1 | SUBJECT | OPENING |
| | VIDEO IMAGE | STILL IMAGE |
| | PRIMARY EFFECT 1 | TITLE 1 |
| | PRIMARY EFFECT 2 | NONE |
| | LENGTH | TITLE 1 |
| | IMAGE QUALITY | TITLE 2 |
| | PART UNIT PRICE | BGM |
| CUT 2 | SUBJECT | SOUND EFFECT |
| | VIDEO IMAGE | NARRATION |
| | PRIMARY EFFECT 1 | |
| | PRIMARY EFFECT 2 | CHROMAKEY COMPOSITE |
| | LENGTH | 3 SECONDS |
| | IMAGE QUALITY | SD MODERATE IMAGE QUALITY DSR300 |
| | PART UNIT PRICE | |
| CUT 3 | SUBJECT | OPENING |
| | VIDEO IMAGE | SHOT IMAGE |
| | PRIMARY EFFECT 1 | TITLE 1 |
| | PRIMARY EFFECT 2 | CHROMAKEY COMPOSITE |
| | LENGTH | 5 SECONDS |
| | IMAGE QUALITY | SD MODERATE IMAGE QUALITY DSR300 |
| | PART UNIT PRICE | |

FIG.8

| CUT | SUBJECT | ~250 |
| --- | --- | --- |
| | VIDEO IMAGE | ~251 |
| | PRIMARY EFFECT | ~252 |
| | CUT LENGTH | ~253 |
| | IMAGE QUALITY | ~254 |
| | CUT PART UNIT PRICE | ~255 |

| | |
| --- | --- |
| NONE(MONOCHROME) | ~251-1 |
| STILL IMAGE | |
| CG1 | |
| CG2 | |
| SHOT IMAGE | |
| READY-MADE MATERIAL 1 | |
| READY-MADE MATERIAL 2 | |
| CHROMAKEY COMPOSITE | |
| SAMPLE 1 | |
| SAMPLE 2 | |
| SAMPLE 3 | |

| | |
| --- | --- |
| NONE | ~252-1 |
| TITLE 1 | |
| TITLE 2 | |
| BGM | |
| SOUND EFFECT | |
| NARRATION | |
| CHROMAKEY COMPOSITE | |
| TELOP | |

| | |
| --- | --- |
| 1 SECOND TO 30 MINUTES | ~253-1 |

| | |
| --- | --- |
| COST PRIORITY PD150 | ~254-1 |
| SD MODERATE IMAGE QUALITY DSR300 | |
| SD HIGH IMAGE QUALITY DVW | |
| HD LOW COST HDV | |
| HD XDCAM-HD | |
| SD HIGH IMAGE QUALITY HDCAM-SR | |

FIG. 9

| BASIC REQUIREMENTS | PURPOSE | PRODUCT SALES PROMOTION |
|---|---|---|
| | LENGTH | 5 MINUTES |
| | DATE OF DELIVERY | SUPERURGENT |
| | IMAGE QUALITY | SD HIGH IMAGE QUALITY DVW |
| | MANNER OF DELIVERY | DVD |
| | IRED PRICE | 1,000,000 |

| | | | VIDEO-IMAGE MATERIAL | SCENE DESCRIPTION |
|---|---|---|---|---|
| SCENE 1 | AIM | OPENING | SUNSET GLOW | NIGHT ACTIVITIES BEGIN WITH A SUNSET GLOW |
| | VIDEO IMAGE | STILL IMAGE | 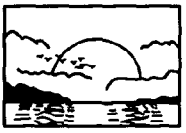 | |
| | PRIMARY EFFECT 1 | TITLE 1 | | |
| | PRIMARY EFFECT 2 | CHROMAKEY COMPOSITE | | |
| | LENGTH | 15 SECONDS | | |
| | IMAGE QUALITY | SD MODERATE IMAGE QUALITY DSR300 | | |
| | NUMBER OF CONSTITUENT CUTS | 3 | | |
| | PART UNIT PRICE | | | |
| SCENE 2 | AIM | EARLY STAGE(INTRODUCTION) | ANIMAL | PANDA AT ZOO FINALLY BECOMES FREE FROM SPECTATORS |
| | VIDEO IMAGE | SHOT IMAGE |  | |
| | PRIMARY EFFECT 1 | NARRATION | | |
| | PRIMARY EFFECT 2 | TELOP | | |
| | LENGTH | 1 MINUTE | | |
| | IMAGE QUALITY | SD MODERATE IMAGE QUALITY DSR300 | | |
| | NUMBER OF CONSTITUENT CUTS | 4 | | |
| | PART UNIT PRICE | | | |
| SCENE 3 | AIM | MIDDLE STAGE(DEVELOPMENT) | ANIMAL | LION AT ZOO ALSO BEGINS TO MOVE PEACEFULLY |
| | VIDEO IMAGE | SHOT IMAGE |  | |
| | PRIMARY EFFECT 1 | BGM | | |
| | PRIMARY EFFECT 2 | TELPO | | |
| | LENGTH | 30 SECONDS | | |
| | IMAGE QUALITY | SD MODERATE IMAGE QUALITY DSR300 | | |
| | NUMBER OF CONSTITUENT CUTS | 6 | | |
| | PART UNIT PRICE | | | |
| SCENE 4 | AIM | MIDDLE STAGE(TURN) | CAR | CAR GOES THROUGH UNDER DUSKY SKY |
| | VIDEO IMAGE | PRECREATED MATERIAL 1 |  | |
| | PRIMARY EFFECT 1 | BGM | | |
| | PRIMARY EFFECT 2 | CHROMAKEY COMPOSITE | | |
| | LENGTH | 30 SECONDS | | |
| | IMAGE QUALITY | SD MODERATE IMAGE QUALITY DSR300 | | |
| | NUMBER OF CONSTITUENT CUTS | 4 | | |
| | PART UNIT PRICE | | | |
| SCENE 5 | AIM | LATE STAGE(CONCLUSION) | HUMAN | SALESMAN AFTER WORK DISAPPEARS INTO NIGHTTOWN |
| | VIDEO IMAGE | SHOT IMAGE |  | |
| | PRIMARY EFFECT 1 | NARRATION | | |
| | PRIMARY EFFECT 2 | NONE | | |
| | LENGTH | 1 MINUTE | | |
| | IMAGE QUALITY | SD MODERATE IMAGE QUALITY DSR300 | | |
| | NUMBER OF CONSTITUENT CUTS | 3 | | |
| | PART UNIT PRICE | | | |
| SCENE 6 | AIM | ENDING | PIANO | PIANO SOUNDS FLOAT IN DIM BAR |
| | VIDEO IMAGE | SHOT IMAGE |  | |
| | PRIMARY EFFECT 1 | NARRATION | | |
| | PRIMARY EFFECT 2 | BGM | | |
| | LENGTH | 30 SECONDS | | |
| | IMAGE QUALITY | SD MODERATE IMAGE QUALITY DSR300 | | |
| | NUMBER OF CONSTITUENT CUTS | 4 | | |
| | PART UNIT PRICE | | | |

| TOTAL PRICE | 1,500,000 |
|---|---|

FIG. 10

| | | | VIDEO-IMAGE MATERIAL | SCENE DESCRIPTION |
|---|---|---|---|---|
| CUT 1 | SUBJECT | OPENING | SUNSET GLOW | SUNSET GLOW IN FAST-FORWARD (DARKNESS COMES IN 10 SECONDS) |
| | VIDEO IMAGE | STILL IMAGE | | |
| | PRIMARY EFFECT 1 | TITLE 1 | | |
| | PRIMARY EFFECT 2 | CHROMAKEY COMPOSITE | | |
| | LENGTH | 7 SECONDS | | |
| | IMAGE QUALITY | SD MODERATE IMAGE QUALITY DSR300 | | |
| | PART UNIT PRICE | | | |
| CUT 2 | SUBJECT | OPENING | HELICOPTER | BEGINS TO MOVE |
| | VIDEO IMAGE | SHOT IMAGE | | |
| | PRIMARY EFFECT 1 | TITLE 1 | | |
| | PRIMARY EFFECT 2 | CHROMAKEY COMPOSITE | | |
| | LENGTH | 3 SECONDS | | |
| | IMAGE QUALITY | SD MODERATE IMAGE QUALITY DSR300 | | |
| | PART UNIT PRICE | | | |
| CUT 3 | SUBJECT | OPENING | HUMAN | CENTRAL CHARACTER APPEARS |
| | VIDEO IMAGE | SHOT IMAGE | | |
| | PRIMARY EFFECT 1 | TITLE 1 | | |
| | PRIMARY EFFECT 2 | CHROMAKEY COMPOSITE | | |
| | LENGTH | 5 SECONDS | | |
| | IMAGE QUALITY | SD MODERATE IMAGE QUALITY DSR300 | | |
| | PART UNIT PRICE | | | |

FIG. 12

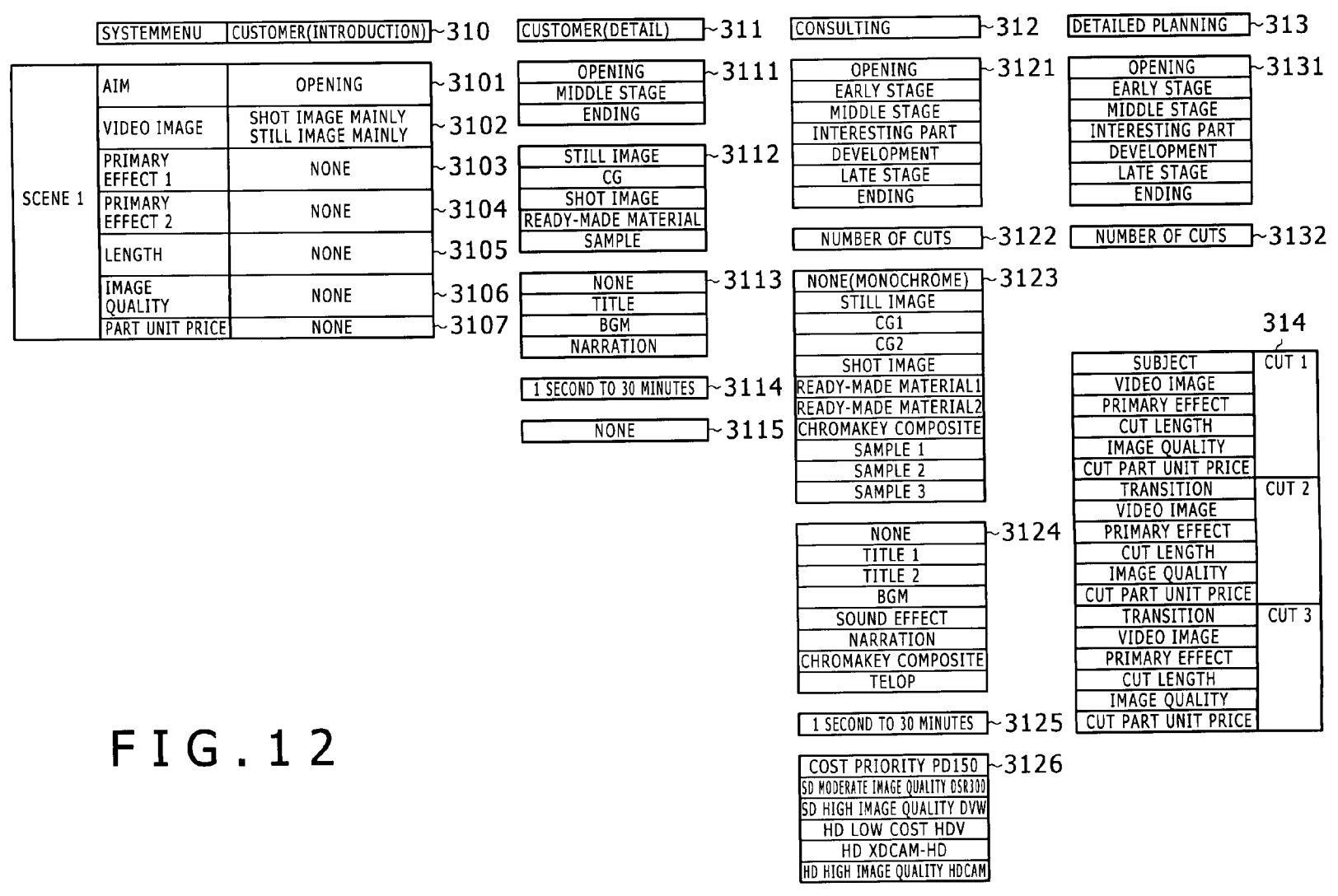

310 SYSTEM MENU / CUSTOMER (INTRODUCTION)

| SCENE 1 | SYSTEM MENU | CUSTOMER (INTRODUCTION) |
|---|---|---|
| AIM | | OPENING |
| VIDEO IMAGE | | SHOT IMAGE MAINLY / STILL IMAGE MAINLY |
| PRIMARY EFFECT 1 | | NONE |
| PRIMARY EFFECT 2 | | NONE |
| LENGTH | | NONE |
| IMAGE QUALITY | | NONE |
| PART UNIT PRICE | | NONE |

- 3101 AIM
- 3102 VIDEO IMAGE
- 3103 PRIMARY EFFECT 1
- 3104 PRIMARY EFFECT 2
- 3105 LENGTH
- 3106 IMAGE QUALITY
- 3107 PART UNIT PRICE

311 CUSTOMER (DETAIL)

- 3111: OPENING / MIDDLE STAGE / ENDING
- 3112: STILL IMAGE / CG / SHOT IMAGE / READY-MADE MATERIAL / SAMPLE
- 3113: NONE / TITLE / BGM / NARRATION
- 3114: 1 SECOND TO 30 MINUTES
- 3115: NONE

312 CONSULTING

- 3121: OPENING / EARLY STAGE / MIDDLE STAGE / INTERESTING PART / DEVELOPMENT / LATE STAGE / ENDING
- 3122 NUMBER OF CUTS
- 3123: NONE (MONOCHROME) / STILL IMAGE / CG1 / CG2 / SHOT IMAGE / READY-MADE MATERIAL1 / READY-MADE MATERIAL2 / CHROMAKEY COMPOSITE / SAMPLE 1 / SAMPLE 2 / SAMPLE 3
- 3124: NONE / TITLE 1 / TITLE 2 / BGM / SOUND EFFECT / NARRATION / CHROMAKEY COMPOSITE / TELOP
- 3125: 1 SECOND TO 30 MINUTES
- 3126: COST PRIORITY PD150 / SD MODERATE IMAGE QUALITY DSR300 / SD HIGH IMAGE QUALITY DVW / HD LOW COST HDV / HD XDCAM-HD / HD HIGH IMAGE QUALITY HDCAM

313 DETAILED PLANNING

- 3131: OPENING / EARLY STAGE / MIDDLE STAGE / INTERESTING PART / DEVELOPMENT / LATE STAGE / ENDING
- 3132 NUMBER OF CUTS

314

| | CUT 1 | CUT 2 | CUT 3 |
|---|---|---|---|
| SUBJECT | | | |
| VIDEO IMAGE | | | |
| PRIMARY EFFECT | | | |
| CUT LENGTH | | | |
| IMAGE QUALITY | | | |
| CUT PART UNIT PRICE | | | |
| TRANSITION | | | |
| VIDEO IMAGE | | | |
| PRIMARY EFFECT | | | |
| CUT LENGTH | | | |
| IMAGE QUALITY | | | |
| CUT PART UNIT PRICE | | | |
| TRANSITION | | | |
| VIDEO IMAGE | | | |
| PRIMARY EFFECT | | | |
| CUT LENGTH | | | |
| IMAGE QUALITY | | | |
| CUT PART UNIT PRICE | | | |

FIG.17

| EDIT TARGET VIDEO IMAGE | ATTRIBUTE INFORMATION OF EDIT TARGET VIDEO IMAGE | EDITED VIDEO IMAGE | EDITED VIDEO-IMAGE ATTRIBUTE INFORMATION | CORRECTION PARAMETER | |
|---|---|---|---|---|---|
|  | LOCATION : MT. FUJI<br>LIGHTING : FRONT LIGHTING<br>SEASON : SPRING<br>TIME PERIOD : DAYTIME<br>WEATHER : CLEAR<br>VISIBILITY : GOOD |  | MT. FUJI,<br>FRONT LIGHTING, SPRING<br>DAYTIME, CLEAR, GOOD | EDITING EFFECT : E0 | CAMERA SETTING : C1 |
| | |  | MT. FUJI,<br>FRONT LIGHTING, SPRING<br>DAYTIME, CLOUDY, GOOD | EDITING EFFECT : E1 | CAMERA SETTING : C1 |
| | |  | MT. FUJI,<br>FRONT LIGHTING, SPRING<br>DAYTIME, RAINY, FOGGY | EDITING EFFECT : E2 | CAMERA SETTING : C1 |
| | |  | MT. FUJI,<br>FRONT LIGHTING, SPRING<br>EVENING, CLEAR, GOOD | EDITING EFFECT : E5 | CAMERA SETTING : C1 |
| ... | | ... | ... | ... | |

FIG. 19A

SHOT VIDEO IMAGE (EDIT TARGET VIDEO IMAGE)

| 702 | 704 | 706 | 708 | 710 | 712 | 714 | 716 |
|---|---|---|---|---|---|---|---|
| SUBJECT | LOCATION | SEASON | TIME PERIOD | WEATHER | VISIBILITY | EDITING EFFECT | CAMERA SETTING |
| CLOSE-UP | MT.FUJI 1 | EARLY SPRING | MORNING | CLEAR | GOOD | EFFECT E0 | SETTING C1 |

720

EDITED VIDEO IMAGE

| 702 | 704 | 706 | 708 | 710 | 712 | 714 | 716 | |
|---|---|---|---|---|---|---|---|---|
| SUBJECT | LOCATION | SEASON | TIME PERIOD | WEATHER | VISIBILITY | EDITING EFFECT | CAMERA SETTING | |
| CLOSE-UP | MT.FUJI 1 | EARLY SPRING | MORNING | CLOUDY | GOOD | EFFECT E1 | SETTING C1 | ~722a |
| CLOSE-UP | MT.FUJI 1 | EARLY SPRING | EVENING | CLEAR | GOOD | EFFECT E2 | SETTING C1 | ~722b |
| CLOSE-UP | MT.FUJI 1 | EARLY SPRING | EVENING | CLOUDY | GOOD | EFFECT E3 | SETTING C1 | ~722c |
| CLOSE-UP | MT.FUJI 1 | EARLY SPRING | MORNING | CLOUDY | FOGGY | EFFECT E4 | SETTING C1 | ~722d |
| CLOSE-UP | MT.FUJI 1 | EARLY SPRING | EVENING | CLOUDY | FOGGY | EFFECT E5 | SETTING C1 | ~722e |

EDIT TARGET VIDEO IMAGE

| SUBJECT | LOCATION | SEASON | TIME PERIOD | WEATHER | VISIBILITY | EDITING EFFECT | CAMERA SETTING |
|---|---|---|---|---|---|---|---|
| CLOSE-UP | MT.FUJI 1 | EARLY SPRING | MORNING | CLOUDY | GOOD | EFFECT E6 | SETTING C2 |
| CLOSE-UP | MT.FUJI 1 | EARLY SPRING | EVENING | CLEAR | GOOD | EFFECT E7 | SETTING C3 |
| CLOSE-UP | MT.FUJI 1 | EARLY SPRING | EVENING | CLOUDY | GOOD | EFFECT E8 | SETTING C4 |
| CLOSE-UP | MT.FUJI 1 | EARLY SPRING | MORNING | CLOUDY | FOGGY | EFFECT E9 | SETTING C5 |
| CLOSE-UP | MT.FUJI 1 | EARLY SPRING | EVENING | CLOUDY | FOGGY | EFFECT E10 | SETTING C6 |

702  704  706  708  710  712  714  716

724

EDITED VIDEO IMAGE

| SUBJECT | LOCATION | SEASON | TIME PERIOD | WEATHER | VISIBILITY |
|---|---|---|---|---|---|
| CLOSE-UP | MT.FUJI 1 | EARLY SPRING | MORNING | CLEAR | GOOD |

| | SUBJECT | LOCATION | SEASON | TIME PERIOD | WEATHER | VISIBILITY | EDITING EFFECT | CAMERA SETTING |
|---|---|---|---|---|---|---|---|---|
| 802 SHOOTING PLAN | CLOSE-UP | MT. YOTEI | SPRING | MORNING | CLEAR | GOOD | | |
| 804 PREVIEW SAMPLE | CLOSE-UP | MT. FUJI 1 | SPRING | MORNING | CLEAR | GOOD | | |

702 / 704 / 706 / 708 / 710 / 712 / 714 / 716

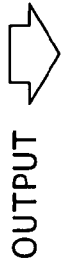

OUTPUT

SHOOTING ASSISTANCE INFORMATION 806

| | LIGHTING | SUBJECT | LOCATION | SEASON | TIME PERIOD | WEATHER | VISIBILITY | EDITING EFFECT | CAMERA SETTING |
|---|---|---|---|---|---|---|---|---|---|
| 808a SHOOTING INSTRUCTION 1 | FRONT LIGHTING | CLOSE-UP | MT. YOTEI | SUMMER | MORNING | CLEAR | GOOD | EFFECT E0 | SETTING C1 |
| 808b SHOOTING INSTRUCTION 2 | FRONT LIGHTING | CLOSE-UP | MT. YOTEI | SUMMER | MORNING | CLOUDY | GOOD | EFFECT E1 | SETTING C2 |
| 808c SHOOTING INSTRUCTION 3 | FRONT LIGHTING | CLOSE-UP | MT. YOTEI | SUMMER | MORNING | DRIZZLING | GOOD | EFFECT E2 | SETTING C3 |
| 808d SHOOTING INSTRUCTION 4 | FRONT LIGHTING | CLOSE-UP | MT. YOTEI | SUMMER | DAYTIME | CLEAR | MISTY | EFFECT E3 | SETTING C4 |
| 808e SHOOTING INSTRUCTION 5 | FRONT LIGHTING | CLOSE-UP | MT. YOTEI | SUMMER | DAYTIME | CLOUDY | MISTY | EFFECT E4 | SETTING C5 |
| 808f SHOOTING INSTRUCTION 6 | FRONT LIGHTING | CLOSE-UP | MT. YOTEI | SUMMER | DAYTIME | DRIZZLING | MISTY | EFFECT E5 | SETTING C6 |

700 / 702 / 704 / 706 / 708 / 710 / 712 / 714 / 716

INFORMATION PROCESSING APPARATUS, INFORMATION PROCESSING METHOD, AND COMPUTER PROGRAM

CROSS REFERENCES TO RELATED APPLICATIONS

The present invention contains subject matter related to Japanese Patent Application JP 2005-223972, filed in the Japanese Patent Office on Aug. 2, 2005, the entire contents of which being incorporated herein by reference.

BACKGROUND OF THE INVENTION

1. Field of the Invention

The present invention relates to an information processing apparatus, an information processing method, and a computer program. More specifically, the present invention relates to an information processing apparatus, an information processing method, and a computer program, which create a plurality of edited images from a single image and store edit information as to the editing of the image.

2. Description of the Related Art

In general, owing to cost requirements of a content production, a user who produces a content for business use normally performs planning, shooting, and editing of the content all by himself or herself instead of dividing necessary processes for the content production between professionals of respective processes to produce a sophisticated content. However, there are a few users who have sophisticated skills in a plurality of operations performed in a plurality of processes for the content production. Most users are skilled in some operations but not in others.

In general, when creating a content, the user needs to consider scenes that constitute the content, shoot each of the scenes, and edit the content. Such operations are not easy even for a professional content creator if he or she is not experienced in some areas of the operations. As such, there has been proposed a system for assisting in content creation (see, for example, Japanese Patent Laid-open No. 2004-32277, referred to as Patent Document 1 hereinafter). According to a content creation system as described in Patent Document 1, content plan data is generated based on a template in which a structure and contents of scenes are set in such a manner as to provide a guide, whereby even an inexperienced user can design a content plan with a sophisticated level. Further, by carrying out a shooting based on the content plan data and allocating video image signals obtained by the shooting to the scenes in the content plan data, it is possible to easily complete the content based on the content plan data.

However, although the above related art system facilitates the planning and editing of the content, obtaining a desired video image is still difficult for a user who is not skilled in shooting or editing of video images. For example, even if it is planned to shoot a video image of a mountain on a clear day, if the weather is cloudy on the day of shooting, the user is not able to shoot a desired video image. Even in such a case, an experienced professional of the shooting and editing of video images would easily obtain the desired video image with his or her shooting and editing techniques. However, inexperienced users or users who are not skilled in the shooting and editing of video images will have to spend a great amount of time and energy to obtain the desired video image, e.g., changing the setting of a camera device many times for shooting, or trying various editing operations at the stage of editing video images obtained by the shooting. It may sometimes happen that a plan should be changed, for example, to carry out a shooting again on another day.

As such, the present invention has been made in view of such problems, and an advantage of the present invention is to provide an information processing apparatus, an information processing method, and a computer program, which are capable of widening a professional area related to the shooting and editing of video images, thereby making it easy and more certain to acquire a desired video image.

SUMMARY OF THE INVENTION

To solve the problems described above, according to one embodiment of the present invention, there is provided an information processing apparatus including: an image input section configured to input an edit target image; an edit target image attribute input section configured to input attribute information of the edit target image; a display control section configured to display the edit target image on a display screen; a user instruction input section configured to input an instruction from a user; a correction parameter acquisition section configured to acquire, from the user instruction input section, a correction parameter for editing the edit target image; an image editing section configured to edit the edit target image displayed on the display screen in accordance with the correction parameter to create an edited image; an edited image attribute acquisition section configured to acquire, from the user instruction input section, attribute information of the edited image created by the image editing section by editing the edit target image; an edit information generation section configured to associate the attribute information of the edit target image, the attribute information of the edited image, and the correction parameter with one another to generate edit information; and an edit information storage section configured to store the edit information.

According to the above embodiment, an image inputted by the image input section is edited by the image editing section in accordance with the correction parameter acquired by the correction parameter acquisition section from the user instruction input section. Then, the edit information generation section associates the attribute information of the image before being edited, the attribute information of the image created by the edition, and the correction parameter to generate the edit information, and the edit information is stored in the edit information storage section. The edit information is information that indicates that if a certain image that has the attribute information of the edit target image is edited in accordance with the correction parameter associated therewith, an image that has the attribute information of the edited image associated therewith is obtained. Therefore, if a user who has obtained an image having certain attribute information desires to create a desired image from that image, he or she has to refer to the edit information generated when edition thereof was performed in the past and edit the image in accordance with the correction parameter contained in the edit information. The user does not have to try various editing operations every time. Thus, the user is able to obtain the desired video image easily.

The edit information may further include the edit target image and the edited image. In this case, the edit target image and a plurality of edited images created from the edit target image are stored in the edit information storage section.

The edit target image may be an image obtained by carrying out a shooting using a camera device. In this case, the correction parameter may include a setting value of the camera device.

The attribute information of the edit target image may include shooting environment information that indicates an environment of a shooting location when the edit target image is shot, and the attribute information of the edited image may include virtual shooting environment information that indicates a virtual shooting environment of the edited image, the virtual shooting environment information being inputted to the user instruction input section.

The shooting environment information and the virtual shooting environment information may include at least one of location information, weather information, season information, time period information, and visibility state information.

The information processing apparatus may further include: a shooting plan information acquisition section configured to acquire, from the instruction input section, shooting plan information including desired shooting environment information that indicates a desired environment of a shooting location; an edit information extraction section configured to extract, from the edit information storage section, the edit information, the attribute information of the edited image within the edit information containing the virtual shooting environment information that corresponds to the desired shooting environment information; and a shooting assistance information output section configured to output, to an outside of the information processing apparatus, shooting assistance information that includes a combination of the shooting environment information and the correction parameter contained in the edit information extracted by the edit information extraction section.

The desired shooting environment information may include at least one of location information, weather information, season information, time period information, and visibility state information.

The edit target image may be a moving image.

In another embodiment of the present invention, there is provided a computer program that causes a computer having installed therein an application for editing an image to execute the processes of: inputting an edit target image; inputting attribute information of the edit target image; providing the edit target image to the application; acquiring, from the application, a correction parameter used for editing the edit target image; accepting an instruction from a user; through the process of accepting the instruction from the user, acquiring attribute information of an edited image created by the application by editing the edit target image; associating the attribute information of the edit target image, the attribute information of the edited image, and the correction parameter with one another to generate edit information; and storing the edit information in an edit information storage section. The computer program is stored in a storage section included in the computer and loaded into and executed by a CPU included in the computer, thereby causing the computer to function as the above-described information processing apparatus. There is also provided a computer-readable storage medium having stored therein the computer program. Examples of the storage medium include a magnetic disk, an optical disk, and the like.

The computer program may cause the computer to further execute a process of changing the correction parameter in accordance with a type of the application, the correction parameter having been acquired by the process of acquiring the correction parameter.

In yet another embodiment of the present invention, there is provided an information processing method employed by a computer, the method including the steps of: inputting an edit target image; inputting attribute information of the edit target image; displaying the edit target image on a display screen; accepting a first instruction from a user; acquiring a correction parameter for editing the edit target image based on the first instruction; editing the edit target image displayed on the display screen in accordance with the correction parameter to create an edited image; accepting a second instruction from the user; acquiring attribute information of the edited image created by editing the edit target image based on the second instruction; associating the attribute information of the edit target image, the attribute information of the edited image, and the correction parameter with one another to generate edit information; and storing the edit information in an edit information storage section.

In the above information processing method, the method performing a plurality of times, for the edit target image, the steps of: accepting the first instruction from the user; acquiring the correction parameter; editing the edit target image; accepting the second instruction from the user; acquiring attribute information of the edited image; generating the edit information; and storing the edit information.

As described above, the present invention provides an information processing apparatus, an information processing method, and a computer program, which is capable of widening a professional area related to the shooting and editing of video images, thereby making it easy to obtain a desired video image.

BRIEF DESCRIPTION OF THE DRAWINGS

FIG. 1 is a block diagram illustrating a functional structure of a content creation apparatus according to one embodiment of the present invention;

FIG. 2 illustrates an exemplary user input screen displayed in the embodiment;

FIG. 3 illustrates an exemplary scene structure displayed on a screen in the embodiment;

FIG. 4 illustrates another user input screen displayed in the embodiment;

FIG. 5 is a diagram illustrating options of video-image information in the embodiment;

FIG. 6 illustrates a yet another user input screen displayed in the embodiment;

FIG. 7 illustrates a yet another user input screen displayed in the embodiment;

FIG. 8 is a diagram illustrating options of the video-image information in the embodiment;

FIG. 9 illustrates an exemplary content creation planning table displayed in the embodiment;

FIG. 10 illustrates an exemplary creation planning table for video-image cuts in the embodiment;

FIG. 12 is a diagram illustrating options of the video-image information in the embodiment;

FIG. 17 is a diagram illustrating edit information in the embodiment;

FIGS. 19A and 19B are diagrams illustrating the edit information in the embodiment;

FIG. 20 is a diagram illustrating shooting assistance information in the embodiment;

DETAILED DESCRIPTION OF THE PREFERRED EMBODIMENTS

Figure 11:
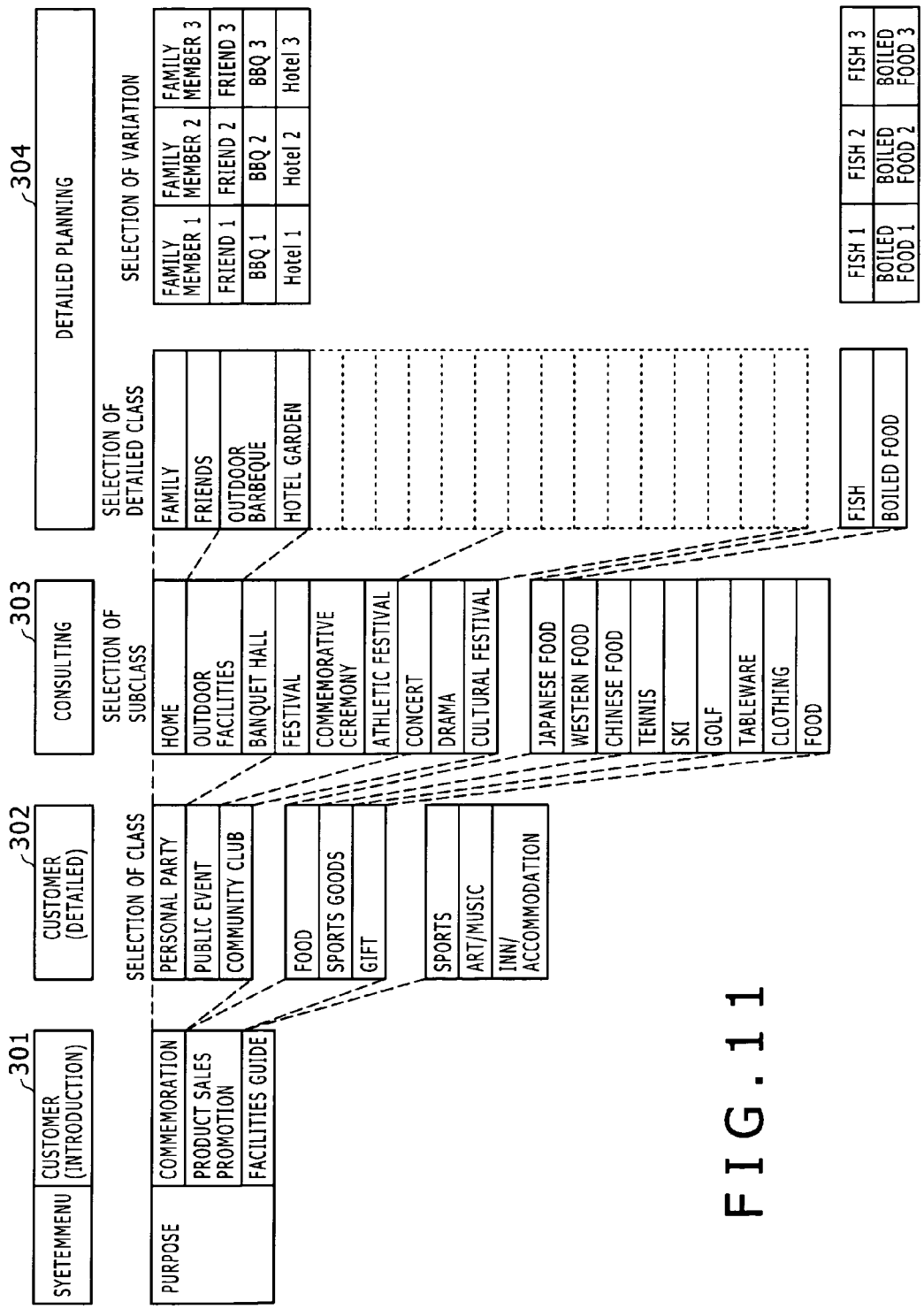
FIG. 11 is a diagram illustrating a hierarchical structure of video-image materials in the embodiment.

In the following, a preferred embodiment of the present invention is described in detail with reference to the accompanying drawings. Note that in the present specification and drawings, structural elements having like functional structures are designated by the same reference numerals, whereby redundant explanation is avoided.

<Outline of Embodiment>

First, in order to facilitate the understanding of the present invention, an outline of the present embodiment will now be described. The present embodiment includes a content creation apparatus that creates a sample content and an information processing apparatus that creates video-image materials, etc., that are used when creating the sample content. First, the content creation apparatus will now be described. In the present embodiment, the content creation apparatus may be applied to a personal computer and the like, for example. A content created by the content creation apparatus is video-image data composed of a plurality of video-image scenes that are combined together. Such a content can also be used, at a planning stage of content creation, as a sample for an actual content that is to be created using video images obtained by shooting. That sample will facilitate visualization of the actual content. Hereinafter, a content that has been completed in accordance with a request of a user will also be referred to as an "actual content", and a content created by the content creation apparatus will also be referred to as a "sample content".

Such contents are created, for example, for a company, a store, or the like to use for their business. For example, using such contents, a company, a store, or the like advertises their facilities or products; a travel agency provides a guide to a sight-seeing place for sales promotion; or a school or a company creates and sells a commemorative video image of a school memorial activity or a company trip.

In order to create a content used for business purpose, it may be required to create a video-image content that fulfills a purpose of its creation, such as sales promotion or guide to facilities, in a short time and at a low cost. In the present embodiment, at a planning stage of the content creation, a sample content containing a plurality of video-image scenes close to an image of an actual content is created in order to lessen redoing of operations, such as modifying a once created actual content, re-creating the actual content, or the like. Thus, it is possible to create the actual content efficiently in a short time.

The video-image scenes that constitute the sample content may be either a moving image or a still image. For example, in accordance with the request of the user, a still image and moving images may be used, respectively, for one video-image scene and the other video-image scenes. Creating the sample content using the moving and/or still images that satisfy demands of the user makes it possible for the user to easily visualize the actual content to be created and create the content efficiently. In the present embodiment, the moving and still images are also referred to as "video-image materials".

The video-image materials may be distributed from a video-image material providing server or the like, or those stored in a storage medium or the like to be sold. Alternatively, the video-image materials may be shot by a content creator himself or herself and stored in a storage medium or the like. In the present embodiment, the video-image materials stored in the storage medium are also referred to as "ready-made" video-image materials. The video-image materials shot by the content creator may be edited before being stored. A method for creating the video-image materials by editing the video images shot by the content creator will be described in detail later, at the time when an information processing apparatus 402 is described.

In the present embodiment, creating the sample content by combining the video-image scenes containing the video-image materials makes it easy to determine, at the planning stage of the content creation, whether the actual content to be created would satisfy a purpose of making use of the content for the user. Specifically, the user who has made a request to create the content is able to check the sample content created using ready-made video-image materials, and make a more detailed demand. Meanwhile, the content creator who has received the request to create the content is able to create the actual content so as to satisfy the demand of the user.

Moreover, selecting the video-image materials used in the sample content in accordance with the demand of the user facilitates the visualization of the actual content to be created and makes it possible to lessen the redoing of operations, such as modifying the once created actual content, re-creating the actual content, or the like. Thus, it is possible to create the actual content efficiently in a short time.

Further, at the planning stage of content creation, one or more of the video-image materials used in the sample content may be replaced by other video-image materials to re-create the sample content. By re-creating the sample content while replacing the video-image materials one by another in accordance with the demand of the user, it is possible to create the sample content so as to reflect the demand of the user on the instant. This makes it possible to shorten the time taken for planning of the creation of the actual content, such as for a preliminary arrangement for the content creation, or the like.

The outline of the present embodiment has been described above. Next, with reference to FIG. 1, a functional structure of the content creation apparatus according to the present embodiment will now be described.

<Functional Structure of Content Creation Apparatus>

FIG. 1 is a block diagram illustrating the functional structure of the content creation apparatus according to the present embodiment. As illustrated in FIG. 1, a content creation apparatus 100 includes an input section 102, an attribute information display section 104, a classification section 106, an attribute information selection section 108, a video-image material acquisition section 110, a content creation section 112, a video-image material storage section 114, a content storage section 116, a scene structure template acquisition section 118, a scene structure template storage section 120, and so on.

The video-image material storage section 114 is a storage device such as a hard disk drive, and stores the video-image materials and attribute information of the video-image materials associated with each other. As described above, the video-image materials may be distributed from a video-image material providing server or the like, or stored in the storage medium or the like and sold therewith. Alternatively, the video-image materials may be shot by the content creator himself or herself and stored in the storage medium or the like.

The attribute information is information representing a name, characteristic, content, and the like of the video-image material. In the case of the video-image material shot by the content creator, a place, time, environment, and the like at or in which the video-image material has been shot may be set as the attribute information. In the case of a video-image material of Mt. Fuji, for example, the attribute information thereof may be "Mountain, Mt. Fuji, Lake Kawaguchi, Yamanashi Prefecture, High Mountain", or the like. In addition, if the video-image material has been shot in winter, "Winter" may also be set as the attribute information.

The classification section 106 has a function of classifying the attribute information by purpose of content creation so as to form a hierarchical structure. The purposes of content creation are the matters that the user is able to accomplish by using contents. Examples of such purposes include a company's promoting the sales of its products and a travel agency's providing a travel guide. For example, attribute information such as "Fish, Food, Gift" may be classified into "Product Sales Promotion". Attribute information such as "Inn, Hotel, Temple" may be classified into "Travel Guide".

Moreover, the classification section 106 hierarchizes the attribute information on creation planning levels. The creation planning levels refer to degrees of particularity of the planning at the planning stage of the creation of the actual content. For example, at an initial planning level of the creation planning, a broad purpose of creation or the like is determined, whereas at a detailed planning level of the creation planning, detailed information such as a video-image content of the actual content is determined. The hierarchization of the attribute information on the creation planning levels makes it possible to provide to the user, and allow the user to select, the attribute information in accordance with the creation planning levels.

For example, in the creation of the actual content, even if the demand of the user is so rough that only the purpose of its creation is decided, it is possible to determine attribute information in a greater detail by proceeding from attribute information satisfying the purpose of creation to attribute information in progressively lower strata. In the case where a great number of video-image materials are stored in the video-image material storage section 114, it is difficult to immediately determine a video-image material that satisfies the demand of the user from among all the video-image materials. Hierarchizing the attribute information of the video-image materials and providing the hierarchized attribute information to the user in a stepwise manner makes it possible to efficiently retrieve the video-image material that satisfies the demand of the user and thus shorten the time taken to determine the video-image material. Thus, it is possible to efficiently carry out a detailed planning for creating the content.

The sample content may be created using a video-image material that is associated with the attribute information on the initial planning level. Alternatively, the sample content may be created using a video-image material that is associated with the attribute information on the detailed planning level. Thus, it is possible to provide the sample content in accordance with the creation planning levels, and accordingly, it is possible to efficiently carry out the planning for creating the actual content.

The input section 102 is an interface having a function of accepting an input by the user. The input section 102 also has a function of accepting an input of the attribute information of the video-image material in accordance with the demand of the user. The attribute information inputted via the input section 102 is supplied to the video-image material acquisition section 110 and the attribute information display section 104.

The attribute information display section 104 has a function of displaying one or more pieces of attribute information that belong to the same stratum as that of the attribute information inputted via the input section 102. The attribute information display section 104 also has a function of, if one piece of attribute information is selected from among the displayed one or more pieces of attribute information, displaying attribute information in a lower stratum than that of the selected piece of attribute information. For example, in the case where the purpose of the content creation is inputted by the user at the initial planning level, the attribute information belonging to the stratum of the initial planning level may be displayed, or alternatively, the attribute information belonging to a lower stratum than that of the purpose of creation inputted may be displayed.

The attribute information selection section 108 has a function of, in response to the user input from the input section 102, selecting at least one piece of attribute information from among the attribute information displayed on the attribute information display section 104. The attribute information selection section 108 supplies the selected piece of attribute information to the video-image material acquisition section 110.

The video-image material acquisition section 110 has a function of acquiring, from the video-image material storage section 114, a video-image material associated with the attribute information inputted from the input section 102. In addition, the video-image material acquisition section 110 may acquire, from the video-image material storage section 114, a video-image material associated with the attribute information supplied from the attribute information selection section 108. The video-image material acquisition section 110 supplies the acquired video-image material to the content creation section 112.

The content creation section 112 has a function of creating a content by combining video-image scenes that contain the video-image materials acquired by the video-image material acquisition section 110. The content created by the content creation section 112 is the sample content, which is created to facilitate the visualization of the actual content to be completed at the planning stage prior to creating the actual content by actually carrying out a shooting and the like, as described above. The content creation section 112 supplies the created sample content to the content storage section 116.

The content storage section 116 is a storage device such as a hard disk drive, and stores the sample content supplied from the content creation section 112. The sample contents may be stored in the content storage section 116 such that the sample contents are classified by purpose of content creation, etc. The content creator can present the sample contents stored in the content storage section 116 to the user who has made the request to create the content, and thus use them for marketing of content creation or selling the created sample contents.

The scene structure template storage section 120 is a storage device such as a hard disk drive, and has a function of storing a scene structure template composed of a plurality of video-image scenes for each of which video-image information is set. The video-image information is setting information of the video-image scene, such as an image quality, a length, and the like. The scene structure template is a content framework in which the number of video-image scenes included in a content, the length of the content, the video-image information of each scene, etc., are previously set. A suitable video-image material may be embedded in each scene of the scene structure template. Also, for each purpose of content creation, a scene structure template in which a video-image material suitable for the purpose of content creation is embedded may be stored.

The scene structure template acquisition section 118 has a function of, in response to the user input from the input section 102, acquiring the scene structure template from the scene structure template storage section 120. The scene structure template acquired by the scene structure template acquisition section 118 is supplied to the content creation section 112. The content creation section 112 may replace a video-image scene in the scene structure template with a video-image scene containing the video-image material supplied from the video-image material acquisition section 110 to create the sample content.

Using the scene structure template to create the sample content makes it possible to easily and efficiently create the sample content that satisfies the purpose of content creation without performing setting of the length of the content, the image quality and length of each video-image scene, and the like. Also, the content creation section 112 may replace a video-image material used in the sample content with another video-image material to re-create the sample content. By thus re-creating the sample content while replacing the video-image materials one by another in accordance with the demand of the user, it is possible to create the sample content so as to reflect the demand of the user on the instant. This makes it possible to efficiently carry out the planning of the creation of the actual content, such as a preliminary arrangement for the content creation or the like.

The functional structure of the content creation apparatus 100 has been described above. Next, with reference to FIGS. 2 to 10, user input screens and display screens related to content creation will be described.

<User Input Screens and Display Screens>

FIG. 2 is an exemplary user input screen displayed at the initial planning level of the content creation. As illustrated in an input screen 202 of FIG. 2, "Purpose", "Length", "Date of Delivery", "Image Quality", "Manner of Delivery", "Desired Price", etc., may be cited as examples of basic requirement categories for content creation at the initial planning level of the content creation. For each basic requirement category, a plurality of items are prepared, and one of them can be selected therefor.

For example, as illustrated in an input screen 204, for the basic requirement category "Purpose", items "Customer Attraction", "Product Sales Promotion", "Facilities Guide", "Travel Guide", "Self-Introduction", "Manual", etc., are prepared, and the user selects one item from those items. The user selects items of the basic requirement categories in accordance with his or her purpose of planning the content creation.

If the user selects the items of the basic requirement categories, the scene structure template as illustrated in FIG. 3 is displayed. As described above, in the scene structure template, the video-image information, such as the image quality, the length, and the like, is set for each of the video-image scenes that constitute the content. As illustrated in FIG. 3, categories "Aim", "Video Image", "Primary Effect", "Length", "Image Quality", "Number of Constituent Cuts", "Part Unit Price", etc., are displayed for each of the video-image scenes that constitute the content, and the content of each category set in the scene structure template is displayed.

For example, the scene structure template illustrated in FIG. 3 is composed of six video-image scenes, i.e., "Opening", "Early Stage (Introduction)", "Middle Stage (Development)", "Middle Stage (Turn)", "Late Stage (Conclusion)", and "Ending". Moreover, the video-image materials used in the respective video-image scenes are also set: a still image for Scene 1, a shot image for Scene 2, and so on. Each of the video-image scenes is composed of a plurality of video-image cuts, and the number of cuts is properly set for each video-image scene.

It is possible for the user to make a change in the scene structure template as illustrated in FIG. 3. As in an exemplary display screen illustrated in FIG. 4, it may be so arranged that the user can make a change in "Aim" of the video-image scene by an input operation.

The video-image information, such as the length and image quality of the video-image scene, set for each video-image scene is selected in accordance with user inputs. FIG. 5 is a diagram illustrating options of various types of video-image information. For example, options 210-1 of "Aim" 210 include "Opening", "Early Stage", "Middle Stage", "Interesting Part", "Development", "Late Stage", and "Ending", and it is possible to change "Opening", as set for the video-image scene in the scene structure template, to "Interesting Part", for example.

Options 211-1 of "Video Image" 211 include "None (Monochrome)", "Still Image", "CG 1", "CG 2", "Shot Image", "Ready-made Material 1", "Ready-made Material 2", "Chromakey Composite", "Sample 1", "Sample 2", and "Sample 3", and it is possible to change "Still Image", as set for the video-image scene in the scene structure template, to "Shot Image", for example. Similarly, options 212-1 of "Primary Effect" 212 include "None", "Title 1", "Title 2", "BGM", "Sound Effect", "Narration", "Chromakey Composite", and "Telop". For "Length" 213, a desired length between one second to 30 minutes can be selected. Options 214-1 of "Image Quality" 214 include "Cost Priority PD150", "SD Moderate Image Quality DSR300", "SD High Image Quality DVW", "HD Low Cost HDV", "HD XDCAM-HD", and "HD High Image Quality HDCAM-SR". For "Number of Constituent Cuts" 215, an arbitrary number, between one and approximately 10, of cuts necessary for the scene structure can be selected.

The video-image scene, the setting of which is performed in the above-described manner, is composed of a plurality of video-image cuts. FIG. 6 illustrates video-image information of the video-image cuts. As with the video-image scene, a plurality of types of video-image information are set for each video-image cut. As with the video-image scene, as illustrated in an exemplary display screen of FIG. 7, it is possible for the user to make a change in the video-image information set for each video-image cut.

The video-image information, such as a length, an image quality, and the like of the video-image cut, set for each video-image cut is selected in accordance with user inputs. FIG. 8 is a diagram illustrating options of the video-image information. For example, types of the video-image information of the video-image cut include "Subject" 250, "Video Image" 251, "Primary Effect" 252, "Cut Length" 253, "Image Quality" 254, and "Cut Part Unit Price" 255. Options 251-1 of "Video Image" 251 include "None (Monochrome)", "Still Image", "CG 1", "CG 2", "Shot Image", "Ready-made Material 1", "Ready-made Material 2", "Chromakey Composite", "Sample 1", "Sample 2", and "Sample 3". Options 252-1 of "Primary Effect" 252 include "None", "Title 1", "Title 2", "BGM", "Sound Effect", "Narration", "Chromakey Composite", and "Telop". For "Cut Length" 253, a desired length between one second and 30 minutes can be selected. Options 254-1 of "Image Quality" 254 include "Cost Priority PD150", "SD Moderate Image Quality DSR300", "SD High Image Quality DVW", "HD Low Cost HDV", "HDXDCAM-HD", and "HD High Image Quality HDCAM-SR".

If the setting, related to the structure of the content, of the items of the basic requirement categories and the video-image information of the video-image scenes that constitute the content is completed in the above-described manner, a content creation planning table as illustrated in FIG. 9 is displayed. FIG. 9 illustrates an exemplary content creation planning table as a display screen. As illustrated in FIG. 9, the content creation planning table makes it possible to check what kind of video-image material is used in each video-image scene. In addition, a creation planning table for the video-image cuts that constitute each video-image scene as illustrated in FIG. 10 is also displayed. In the creation planning table for the video-image cuts also, it is possible to check the video-image material used in each video-image cut.

The above-described content creation section 112 of the content creation apparatus 100 creates the sample content based on the planning tables created in FIGS. 9 and 10.

For the video-image materials used in the video-image scenes and the video-image cuts, video-image materials suited for the purpose of the content creation are acquired from the above-described video-image material storage section 114, and the video-image materials are set in the video-image scenes and the video-image cuts. Also, the attribute information of the video-image materials is inputted by the user, and the video-image materials associated with the inputted attribute information are acquired from the video-image material storage section 114 and set in the video-image scenes and the video-image cuts.

The user input screens and display screens related to the content creation have been described above. Next, with reference to FIGS. 11 and 12, the attribute information and the video-image information in accordance with the content creation planning levels will be described.

<Hierarchical Structure of Attribute Information and Video-Image Information>

As described above, the attribute information is classified by purpose of content creation so as to form a hierarchical structure, and stored in the video-image material storage section 114. FIG. 11 is a diagram illustrating the hierarchical structure of the video-image materials stored in the video-image material storage section 114.

As illustrated in FIG. 11, the attribute information is hierarchized with a customer (introduction) level 301, which is the initial planning level, as the uppermost stratum and a detailed planning level 304 as the lowest stratum. Planning levels include the customer (introduction) level 301, a customer (detail) level 302, a consulting level 303, and the detailed planning level 304. Pieces of attribute information belong to respective planning levels so as to form the hierarchical structure.

For example, on the customer (introduction) level 301, attribute information such as "Commemoration", "Product Sales Promotion", "Facilities Guide", or the like, i.e., the purpose of content creation, is inputted by the user. On the customer (detail) level 302, which is a lower stratum than the customer (introduction) level 301, attribute information such as "Personal Party", "Public Event", "Community Club", or the like is inputted by the user. On the consulting level 303, which is a lower stratum than the customer (detailed) 302 level, attribute information such as "Home", "Outdoor Facilities", "Banquet Hall" or the like is inputted by the user. On the detailed planning level 304, which is a lower stratum than the consulting level 303, attribute information such as "Family", "Friends", or the like is inputted by the user. On the detailed planning level 304, attribute information such as "Family Member 1", "Friend 1", or the like, which belongs to a lower stratum than "Family" or "Friends", is inputted by the user.

As such, the user is able to determine detailed attribute information by proceeding from attribute information in an upper stratum to attribute information in lower strata progressively in the order of the planning levels. As described above, the attribute information is stored so as to be associated with the video-image materials. The video-image materials may be associated with all pieces of attribute information, or alternatively, the video-image materials may be associated only with pieces of attribute information in lower strata. Also, the attribute information in upper strata may be associated with a video-image material that represents that attribute information.

Thus, if the user inputs the attribute information in accordance with the planning level, it is possible to create the sample content using the video-image material associated with the attribute information. For example, the sample content may be created based on the attribute information inputted on the customer (introduction) level 301, or alternatively, the sample content may be created based on the attribute information inputted on the consulting level 303. Thus, the sample content can be created in accordance with the content creation planning level, and it is made possible to create the sample content so as to reflect the demand of the user on the instant.

The video-image information of the content may also be selected in accordance with the planning level. FIG. 12 is a diagram illustrating options of the video-image information. The options are selected by the user in accordance with the planning level. For example, on a customer (introduction) level 310, options of only "Aim" 3101 and "Video Image" 3102 of the video-image scene are selected, and on a customer (detail) level 311, selection of "Aim" 3111, "Video Image" 3112, "Primary Effect" 3113, and "Length" 3114 is performed. Further, on a consulting level 312, selection of the entire video-image information may be performed. Still further, on a detailed planning level 313, selection of the video-image information of the video-image cuts 314 that constitute the video-image scene may be performed.

As described above, the setting of the video-image information of the content can also be performed in a stepwise manner in accordance with the planning levels. It is possible to additionally set or change the video-image information of the sample content that is to be created while shifting the planning level from the customer (introduction) level 310 to the detailed planning level 313. Thus, it is possible to easily and efficiently create the sample content so as to reflect the demand of the user.

The attribute information and the video-image information in accordance with the creation planning levels of the content have been described above. Next, with reference to FIG. 13, a method for creating the content in the content creation apparatus 100 will be described.

<Method for Creating Content>

Figure 13:
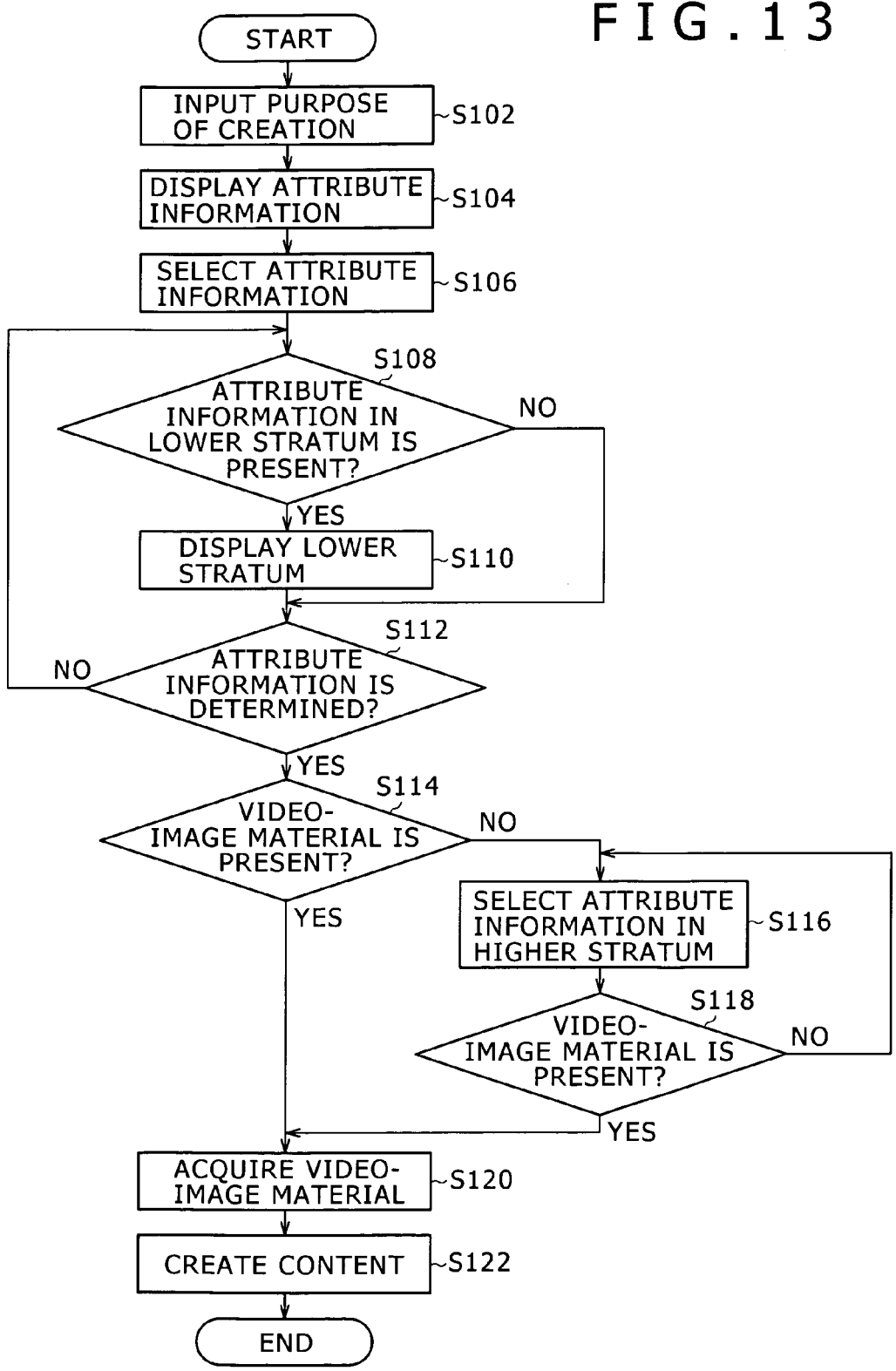
FIG. 13 is a flowchart illustrating a method for creating a content in the embodiment.

FIG. 13 is a flowchart illustrating the method for creating the content in the content creation apparatus 100. As illustrated in FIG. 13, first, the user inputs the purpose of creation (S102). The attribute information suited for the purpose of creation inputted at step S102 is displayed (S104). The user selects one piece of attribute information from the attribute information displayed at step S104 (S106).

It is determined whether there is any attribute information in a lower stratum than that of the piece of attribute information selected at step S106 (S108). If it is determined at step S108 that there is attribute information in the lower stratum, the attribute information in the lower stratum is displayed (S110). If it is determined at step S108 that there is no attribute information in the lower stratum, a process of step S112 is performed.

Next, it is determined whether a piece of attribute information has been determined by the user from among the attribute information displayed (S112). If it is determined at step S112 that the user has determined a piece of attribute information, it is determined whether there is a video-image material associated with the piece of attribute information determined at step S112 (S114). If no attribute information has been determined by the user at step S112, control returns to step S108 and repeats the processes of S108 to S112.

If it is determined at step S114 that there is such a video-image material, that video-image material is acquired (S120). If it is determined at step S114 that there is no such video-image material, the attribute information in a higher stratum than that of the attribute information determined at step S112 is selected (S116). Then, it is determined whether there is a video-image material associated with the attribute information selected at step S116 (S118). If it is determined at step S118 that there is such a video-image material, that video-image material is acquired (S120). If it is determined at step S118 that there is no such video-image material, control returns to step S116 and repeats the processes of steps S116 to S118. After the video-image material is acquired at step S120, the content is created (S122).

The method for creating the content in the content creation apparatus 100 has been described above. According to the above-described structure, hierarchizing the attribute information of the video-image materials and providing to the user the hierarchized attribute information in a stepwise manner makes it possible to efficiently retrieve video-image materials that satisfy the demand of the user and shorten the time taken to determine the video-image materials. Moreover, using a moving image and/or a still image suited for the demand of the user to create the sample content makes it easy to visualize the actual content to be created. Thus, it is possible to efficiently create the content without carrying out an unnecessary shooting or replanning the content creation.

<On Registration of Video Images and Attribute Information>

The information processing apparatus 402 that creates the video-image materials and the attribute information thereof will now be described below. The information processing apparatus 402 is capable of supplying the video-image materials and the attribute information which have been created to the content creation apparatus 100. The content creation apparatus 100 is capable of storing the video-image materials and the attribute information supplied from the information processing apparatus 402 in the video-image material storage section 114, and using them to create the sample content as described above.

The information processing apparatus 402 according to the present embodiment is capable of editing the video images, generating edit information, storing the edit information, and outputting the edit information. Note that in the present embodiment, the video images comprehending a moving image are adopted as exemplary images that are to be edited. However, the present embodiment is not limited to this example. Such images may be still images or may include both a still image and a moving image. The video images may be composed of only moving images, or alternatively, they may come with audio. Also note that in the present embodiment, the images to be edited are video images shot by the user with a camera device. However, the present embodiment is not limited to this example. For example, such images may be copyright-free video images downloaded from the Internet.

Figure 14:
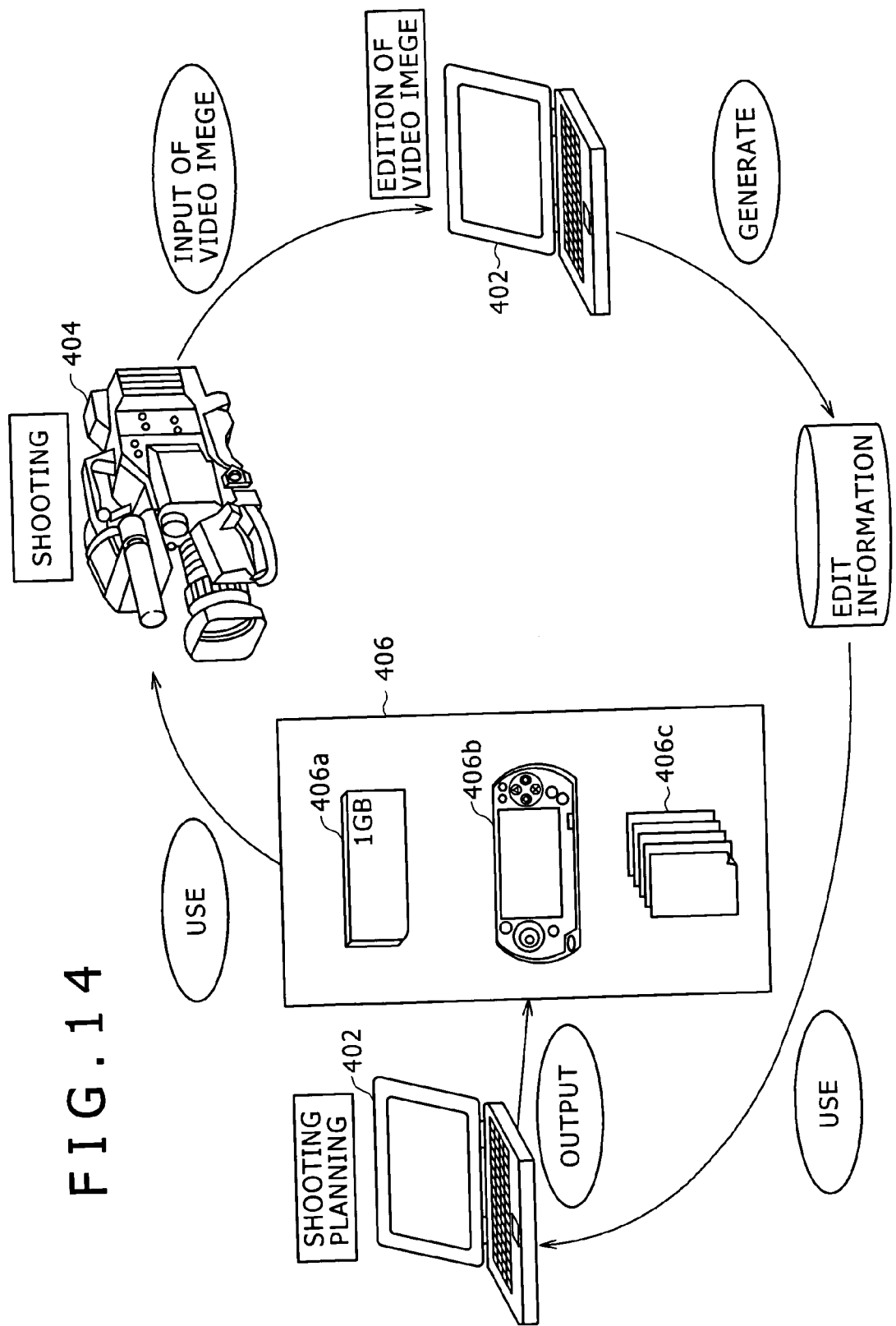
FIG. 14 is a diagram illustrating a flow of shooting and editing of a video image performed by a user using an information processing apparatus according to the embodiment of the present invention.

First, with reference to FIG. 14, a procedure in which the user shoots and edits the video images using the information processing apparatus 402 according to the present embodiment will now be described. First, the user uses the information processing apparatus 402 to plan a content that he or she desires to create. In the present embodiment, the term "content" refers to a content composed of video images including a moving image, and such contents are created for various purposes, such as a product promotion, an area guide, and the like. Specifically, in order to plan the content, the user determines the structure of scenes in accordance with the purpose of the content, etc., and thereafter determines the structure of cuts for each scene.

After determining the structure of cuts, the user determines a shooting plan for each cut while considering a shooting location, shooting time, a shooting environment such as weather at the shooting time, and the like. Then, according to the shooting plan, the user shoots video images using a camera unit 404. After shooting, the user transfers the shot video images to the information processing apparatus 402, and combines the video images to create the content. In the above procedure, the user is able to create the content.

Next, the user edits the video images obtained by the shooting as described above in various manners, and thus creates a plurality of edited video images from a video image obtained by the shooting. Then, the user uses the information processing apparatus 402 to generate edit information including a shooting environment at the time of shooting, a virtual shooting environment of an edited video image, a shot video image, the edited video image, and a correction parameter used for editing, and stores the edit information in a database.

When creating a content next time, the user is able to use the edit information stored in the database. The user uses the information processing apparatus 402 to generate shooting assistance information from the edit information, and outputs the shooting assistance information to an external storage medium 406. By referring to the shooting assistance information at the time of shooting, the user is able to use the edit information stored in the database. By using the edit information including information related to a shooting environment contained in a current shooting plan, the user is able to derive, from the shooting assistance information, a camera setting for shooting a desired video image and a process of editing the shot video image in accordance with a shooting environment of a shooting day. Specific description thereof will be given later.

Examples of the external storage medium 406 include: an external memory 406a, such as a magnetic storage medium, an optical storage medium, or the like, that is capable of being inserted into the camera unit 404 so that information stored therein is loaded into the camera unit 404 and displayed on a display screen of the camera unit 404; a portable display device 406b, such as a mobile phone, a portable computer, or the like, that is equipped with a display screen for displaying the edit information; and a print medium 406c, such as paper, or the like, on which the edit information is printed. The generation and use of the edit information in the information processing apparatus 402 will now be described in detail below.

<Hardware Configuration of Information Processing Apparatus>

Figure 15:
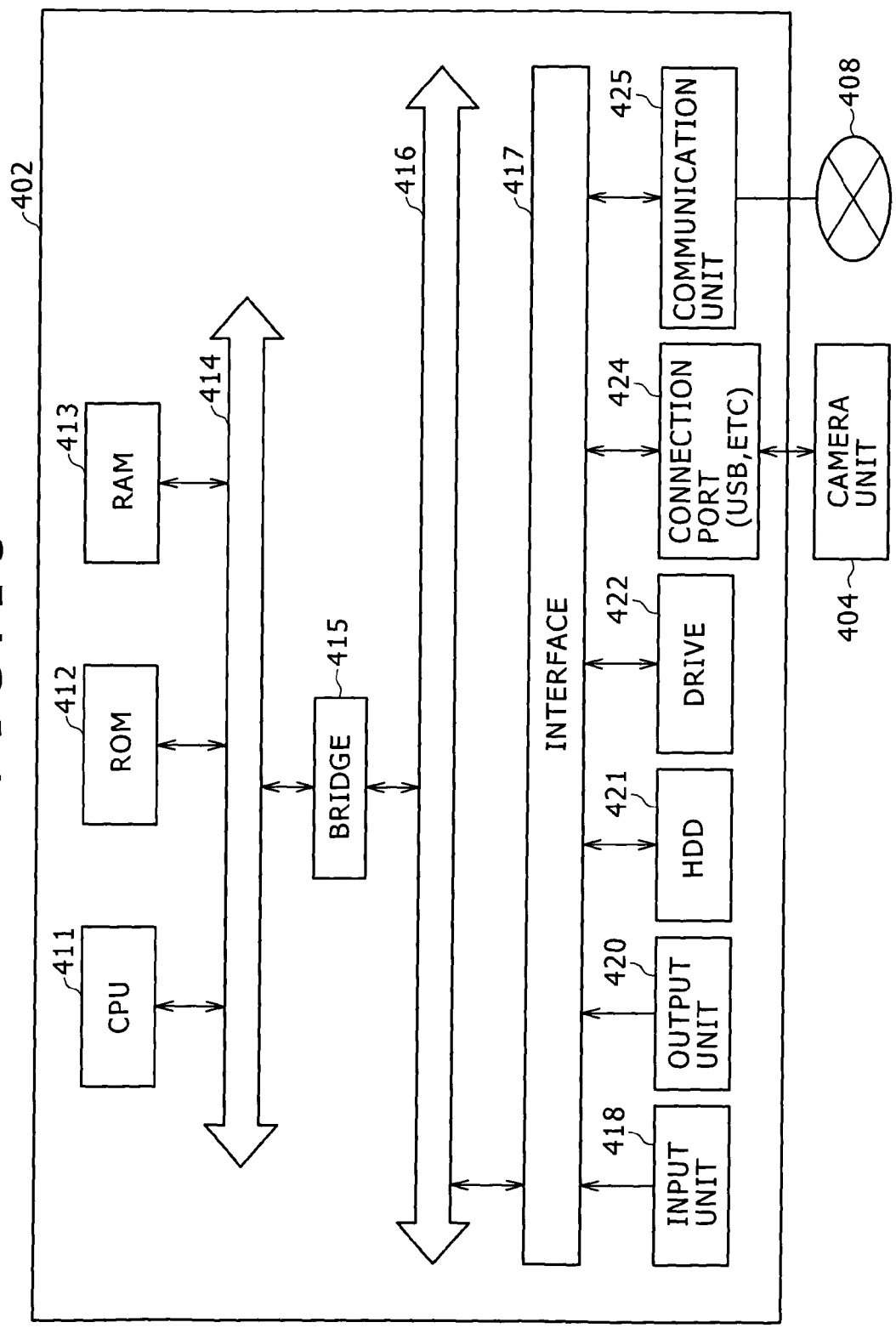
FIG. 15 is a block diagram illustrating a hardware configuration of the information processing apparatus according to the embodiment.

First, with reference to FIG. 15, a hardware configuration of the information processing apparatus 402 will now be described. As illustrated in FIG. 15, the information processing apparatus 402 includes a CPU (Central Processing Unit) 411, a ROM (Read Only Memory) 412, a RAM (Random Access Memory) 413, a host bus 414, a bridge 415, an external bus 416, an interface 417, an input unit 418, an output unit 420, a storage device (HDD) 421, a drive 422, a connection port 424, and a communication unit 425.

The CPU 411 functions as a processor and a controller, operates in accordance with various programs stored in the ROM 412 or the HDD 421, and controls each part within the information processing apparatus 402. Specific processes executed by the CPU 411 include a process of generating the edit information, a process of extracting edit information corresponding to a search condition, and so on.

The ROM 412 stores a program, an operation parameter, etc., used by the CPU 411. The RAM 413 temporarily stores a program used in execution of a process by the CPU 411, a parameter that changes as necessary during the execution thereof, etc. The RAM 413 is also usable for temporarily storing a video image inputted to the information processing apparatus 402, an edited video image, etc. They are interconnected via the host bus 414 formed by a CPU bus or the like.

The host bus 414 is connected via the bridge 415 to the external bus 416 such as a PCI (Peripheral Component Interconnect/interface) bus or the like.

The input unit 418 is composed of an operating device, such as a mouse, a keyboard, a touch panel, a button, a switch, and a lever, an input control circuit that generates an input signal and outputs the input signal to the CPU 411, and so on. By operating the input unit 418, the user of the information processing apparatus 402 is able to input various data to the information processing apparatus 402 or to give an instruction to perform a processing operation.

The output unit 420 is composed, for example, of a display device, such as a CRT (cathode ray tube) display device, a liquid crystal display (LCD) device, and a lamp, or the like, an audio output device, such as a speaker or the like, and so on. The output unit 420 outputs the video image that is to be edited, for example. Note that the output unit 420 may function as a controller that controls an external output device provided outside of the information processing apparatus 402.

The HDD 421 is a device for storing data and is an exemplary storage device in the information processing apparatus 402 according to the present embodiment. The HDD 421 stores the program executed by the CPU 411 and various data. For example, the HDD 421 may store various data such as the video image that is to be edited.

The drive 422 is a reader/writer for a storage medium and contained in or externally attached to the information processing apparatus 402. The drive 422 records and reproduces various data, such as a content, on or from a removable storage medium loaded into the information processing apparatus 402, e.g., a magnetic disk (an HD, etc.), an optical disk (a CD, a DVD, etc.), a magneto-optical disk (an MO, etc.), a semiconductor memory, or the like.

Specifically, the drive 422 reads data stored in the removable storage medium and supplies the data to the RAM 413 connected thereto via the interface 417, the external bus 416, the bridge 415, and the host bus 414. The CPU 411 stores such data in the HDD 421 or the like as necessary. Meanwhile, the drive 422 receives, from the CPU 411, data stored in the ROM 412 or the HDD 421, data newly generated, and data obtained from an external device to write such data on the removable storage medium.

The connection port 424 is a port for connecting the information processing apparatus 402 to an external device such as the camera unit 404, for example, and has a connection terminal, such as a USB terminal, an IEEE1394 terminal, or the like. The connection port 424 is connected to the CPU 411 and so on via the interface 417, the external bus 416, the bridge 415, the host bus 414, etc. By use of the connection port 424, the information processing apparatus 402 is connected to the camera unit 404 or the like, whereby communication of the video images and various other data becomes possible.

The communication unit 425 is a communication interface formed by a communication device or the like used for connection to a communication network 408, for example. The communication unit 425 exchanges various data with the external device via the communication network 408. The hardware configuration of the information processing apparatus 402 has been broadly described above.

<Functional Structure of Information Processing Apparatus>

Figure 16:
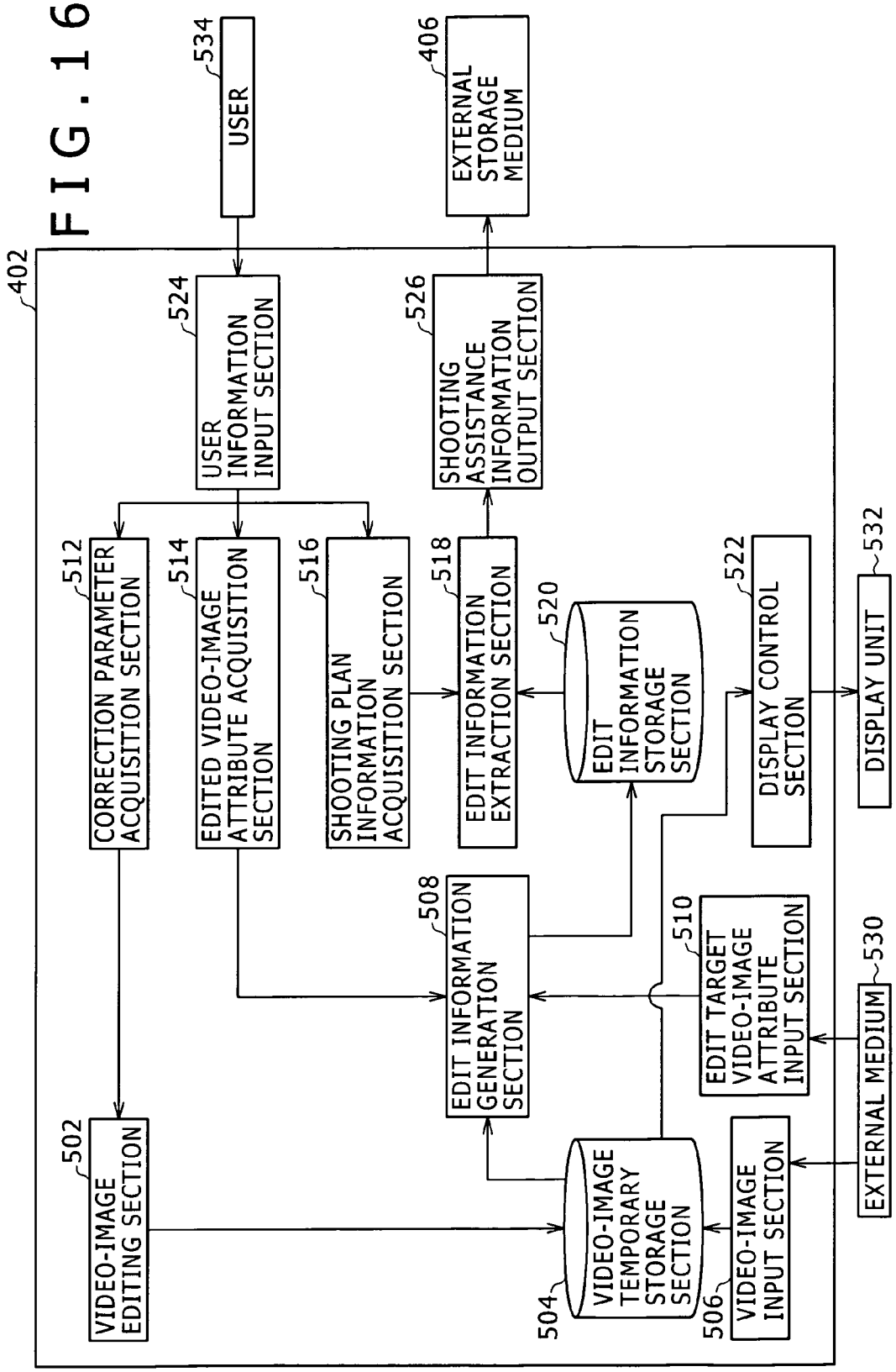
FIG. 16 is a block diagram illustrating a functional structure of the information processing apparatus according to the embodiment.

Next, with reference to FIG. 16, the functional structure of the information processing apparatus 402 will now be described. The information processing apparatus 402 primarily includes a video-image editing section 502, a video-image temporary storage section 504, a video-image input section 506, an edit information generation section 508, an edit target video-image attribute input section 510, a correction parameter acquisition section 512, an edited video-image attribute acquisition section 514, a shooting plan information acquisition section 516, an edit information extraction section 518, an edit information storage section 520, a display control section 522, a user instruction input section 524, a shooting assistance information output section 526, or the like.

The video-image input section 506 is an exemplary image input section and inputs a video image, which is an exemplary edit target image, received from an external medium 530. The external medium 530 is, for example, a medium on which the video image obtained by shooting is recorded, such as an optical disk, a magneto-optical disk, and a magnetic disk. Also, the video-image input section 506 may input the video image obtained by shooting received directly from the camera unit 404. The video-image input section 506 stores the inputted video image in the video-image temporary storage section 504.

The video-image temporary storage section 504 is constructed so as to include the RAM 413, for example, and stores the video image supplied from the video-image input section 506. The video-image temporary storage section 504 also stores an edited video image obtained from editing by and supplied from the video-image editing section 502.

The video-image editing section 502 is an exemplary image editing section, and edits the video image inputted by the video-image input section 506 and stored in the video-image temporary storage section 504. More specifically, based on an instruction by a user 534 inputted to the user instruction input section 524, the video-image editing section 502 edits an edit target video image based on a correction parameter acquired by the correction parameter acquisition section 512 from the user instruction input section 524. The correction parameter includes two types, such as a camera setting value and an effect correction value. The camera setting value is a setting value at the time of shooting by use of the camera unit 404, and includes, for example, values for setting various camera functions, such as exposure, white balance, γ correction, black stretch, and color adjustment. The effect correction value is a value for correcting the video image, and includes, for example, values for adjusting properties related to effect of the video image, such as exposure, white balance, γ correction, 3D effect, trimming, zoom, and brightness. The video-image editing section 502 edits the video image stored in the video-image temporary storage section 504 in accordance with the above-described correction parameter supplied from the correction parameter acquisition section 512. Note that the correction parameter acquisition section 512 that acquires the correction parameter from the user instruction input section 524 and the video-image editing section 502 that edits the video image based on the correction parameter may be substituted by an existing video-image editing application.

The edit target video-image attribute input section 510 is an exemplary edit target image attribute input section, and inputs the attribute information of the edit target video image received from the external medium 530. The attribute information of the edit target video image inputted by the edit target video-image attribute input section 510 to the information processing apparatus 402 includes shooting environment information that indicates an environment of a shooting location at the time when the edit target video image inputted by the video-image input section 506 is shot. The shooting environment information includes at least one of location information, weather information, season information, time period information, and visibility state information. One specific example of the shooting environment information is "location information is Mt. Fuji, weather information is clear, season information is spring, time period information is morning, visibility state information is good". This specific example of the shooting environment information indicates that the video image inputted by the video-image input section 506 to the information processing apparatus 402 is a video image of "Mt. Fuji shot on a clear morning in spring with good visibility". The attribute information of the edit target video image may be stored in the external medium 530 together with the video image obtained by shooting, and the edit target video-image attribute input section 510 may input the attribute information by reading it from the external medium 530. Alternatively, the user may input the attribute information of the edit target video image to the edit target video-image attribute input section 510.

The display control section 522 causes the video image inputted by the video-image input section 506 to be displayed on a display unit 532. The display control section 522 also causes the edited video image obtained by the video-image editing section 502 to be displayed on the display unit 532.

The user instruction input section 524 inputs an instruction received from the user 534. Specifically, the user instruction input section 524 is constructed so as to include the input unit 418, such as a keyboard, and a mouse, and accepts the instruction from the user 534 via the input unit 418.

As described above, the correction parameter acquisition section 512 acquires, from the user instruction input section 524, the correction parameter inputted by the user 534.

The edited video-image attribute acquisition section 514 is an exemplary edited image attribute acquisition section, and acquires, from the user instruction input section 524, the attribute information of the edited video image inputted by the user 534. The attribute information of the edited video image includes virtual shooting environment information that indicates a virtual environment of the edited video image inputted to the user instruction input section 524. The virtual shooting environment information includes at least one of location information, weather information, season information, time period information, and visibility state information. The virtual environment of the edited video image refers to a hypothetical environment of the shooting location assuming the edited video image to have been obtained by an actual shooting, and is inputted based on judgment of the user who has viewed the edited video image. For example, suppose that the above-described video image whose shooting environment information is "location information is Mt. Fuji, weather information is clear, season information is spring, time period information is morning, visibility state information is good" is edited so that the original video image is changed into a darker video image with lower brightness and adjusted color. In this case, the user who has viewed the resultant video image would input the virtual shooting environment information "location information is Mt. Fuji, weather information is cloudy, season information is spring, time period information is morning, visibility state information is good". In other words, this virtual shooting environment information indicates that the resultant, edited video image is a video image of "Mt. Fuji shot on a cloudy morning in spring with good visibility" assuming the edited video image to have been obtained by an actual shooting.

The edit information generation section 508 generates the edit information including the attribute information of the edit target video image, the attribute information of the edited video image, and the correction parameter associated with one another. Also, the edit information generation section 508 may allow the edit information to include the edit target video image and the edited video image.

The edit information storage section 520 is constructed so as to include the HDD 421, for example, and stores the edit information generated by the edit information generation section 508. Here, with reference to FIG. 17, the edit information stored in the edit information storage section 520 will now be described in detail.

As illustrated in FIG. 17, the edit information storage section 520 stores a plurality of pieces of edit information 600a to 600d. In the edit information storage section 520, information corresponding to items "Edit Target Video Image" 602, "Attribute Information of Edit Target Video Image" 604, "Edited Video Image" 606, "Attribute Information of Edited Video Image" 608, and "Correction Parameter" 610 is stored as the edit information.

In the "Edit Target Video Image" 602, the video image to be edited is stored. The video image stored in the "Edit Target Video Image" 602 may be either a video image obtained by shooting or an edited video image obtained by shooting. In other words, a video image that has once been edited may be set as the video image to be edited.

In the "Attribute Information of Edit Target Video Image" 604, the attribute information of the edit target video image inputted by the edit target video-image attribute input section 510 is stored. In FIG. 17, the shooting environment information contained in the attribute information is stored therein. In the "Edited Video Image" 606, the edited video image obtained by editing the edit target video image stored in the "Edit Target Video Image" 602 in accordance with the correction parameter stored in the "Correction Parameter" 610 is stored. In the "Attribute Information of Edited Video Image" 608, the attribute information of the edited video image stored in the "Edited Video Image" 606 is stored. This attribute information is inputted by the user. In FIG. 17, the virtual shooting environment information contained in the attribute information is stored therein. In the "Correction Parameter" 610, the correction parameter used when the video-image editing section 502 edits the edit target video image stored in the "Edit Target Video Image" 602 to obtain the edited video image stored in the "Edited Video Image" 606 is stored.

As described above, the correction parameter includes two types, such as the camera setting value and the effect correction value. Of the correction parameter, the effect correction value is denoted by editing effect E0 to En, and the camera setting value is denoted by camera setting C0 to Cn. The editing effect En is composed of a combination of values for adjusting visual effects such as the exposure, the white balance, the γ correction, the 3D effect, the trimming, the zoom, and the brightness. The camera setting Cn is composed of a combination of values for setting camera functions such as the exposure, the white balance, the γ correction, the black stretch, and the color adjustment.

In the example of FIG. 17, a video image of "Mt. Fuji shot during the daytime on a clear spring day with good visibility and front lighting" is stored as the edit target video image common to all the pieces of edit information 600a to 600d. In addition, four types of edited video images created by editing the edit target video image are stored so as to be associated with the edit target video image and the attribute information thereof. The edited video image of the edit information 600a is a video image obtained by editing the edit target video image using a correction parameter "effect correction value=E0, camera setting value=C1", and can be assumed to be a video image of "Mt. Fuji shot during the daytime on a clear spring day with good visibility and front lighting". Note that if "E0" is set to indicate that no editing effect is applied and "C1" is set to indicate that no camera setting is changed, the edited video image contained in the edit information 600a is in substance identical to the edit target video image. That is, the edit target video image may be stored in the "Edited Video Image" 606 without any editing.

The edited video image of the edit information 600b is a video image obtained by editing the edit target video image using a correction parameter "effect correction value=E1, camera setting value=C1", and can be assumed to be a video image of "Mt. Fuji shot during the daytime on a cloudy spring day with good visibility and front lighting". The edited video image of the edit information 600c is a video image obtained by editing the edit target video image using a correction parameter "effect correction value=E2, camera setting value=C1", and can be assumed to be a video image of "Mt. Fuji shot during the daytime on a foggy and rainy spring day with front lighting". The edited video image of the edit information 600d is a video image obtained by editing the edit target video image using a correction parameter "effect correction value=E5, camera setting value=C1", and can be assumed to be a video image of "Mt. Fuji shot in the evening of a clear spring day with good visibility and front lighting".

The above-described edit information shows that even if the shooting day is a clear day with good visibility despite a shooting plan of "shooting a video image of Mt. Fuji during the daytime on a foggy and rainy spring day", for example, it is possible to obtain a desired video image by shooting a video image of "Mt. Fuji during the daytime on a clear spring day with good visibility and front lighting" with camera setting value C1 and editing the shot video image with effect correction value E2.

Referring back to FIG. 16, the description of the functional structure of the information processing apparatus 402 will now be resumed. The shooting plan information acquisition section 516 acquires, from the user instruction input section 524, shooting plan information including "desired shooting environment information" that indicates a desired environment of the shooting location. The desired shooting environment information includes at least one of location information, weather information, season information, time period information, and visibility state information. For example, in the case where the user desires the video image of "Mt. Fuji shot during the daytime on a foggy and rainy spring day" as described above, information of "location information is Mt. Fuji, weather information is rainy, season information is spring, time period information is daytime, visibility state information is foggy" is inputted to the information processing apparatus 402 as the desired shooting environment information. The shooting plan information acquisition section 516 supplies, to the edit information extraction section 518, the desired shooting environment information acquired from the user instruction input section 524.

The edit information extraction section 518 extracts, from the plurality of pieces of edit information stored in the edit information storage section 520, a piece of edit information whose "Attribute Information of Edited Video Image" 608 contains virtual shooting environment information that corresponds to the desired shooting environment information. More specifically, the edit information extraction section 518 performs a search in the edit information storage section 520 for a record. The record to be searched here has more than a predetermined number of items out of the location information, the weather information, the season information, the time period information, and the visibility state information. These information are contained in both the desired shooting environment information and the virtual shooting environment information. The items of a record contained in the virtual shooting environment information coincide with those in the desired shooting environment information. The edit information extraction section 518 extracts a record found as a result of the search. Then, the edit information extraction section 518 supplies the extracted edit information to the shooting assistance information output section 526.

The shooting assistance information output section 526 outputs, to the external storage medium 406, the shooting assistance information that includes a combination of the shooting environment information and the correction parameter within the edit information acquired from the edit information extraction section 518. Note that the shooting assistance information output section 526 may output all information contained in the edit information.

Note that in the case where the correction parameter acquisition section 512 that acquires the correction parameter from the user instruction input section 524 and the video-image editing section 502 that edits the video image based on the correction parameter are substituted by the existing video-image editing application, the information processing apparatus 402 is equipped with an edit target video image supplying section that supplies the edit target video image to the video-image editing application and a correction parameter acquisition section that acquires, from the application, the correction parameter used for editing the edit target video image. In addition, the information processing apparatus 402 may further include a correction parameter adjustment section that changes the correction parameter acquired by the correction parameter acquisition section from the video-image editing application in accordance with the type of the video-image editing application. In this case, in the edit information storage section 520, a correction parameter after being changed by the correction parameter adjustment section may be stored. Even if the same correction parameter is used for editing the video image, the resulting edited video image may differ between different video-image editing applications. As such, by using the correction parameter adjustment section to perform an adjustment of changing the correction parameter in accordance with the type of the video-image editing application before storing the correction parameter in the edit information storage section 520, the difference between the video-image editing applications will be eliminated. The functional structure of the information processing apparatus 402 has been described above.

<On Generation of Shooting Plan Information>

Figure 18:
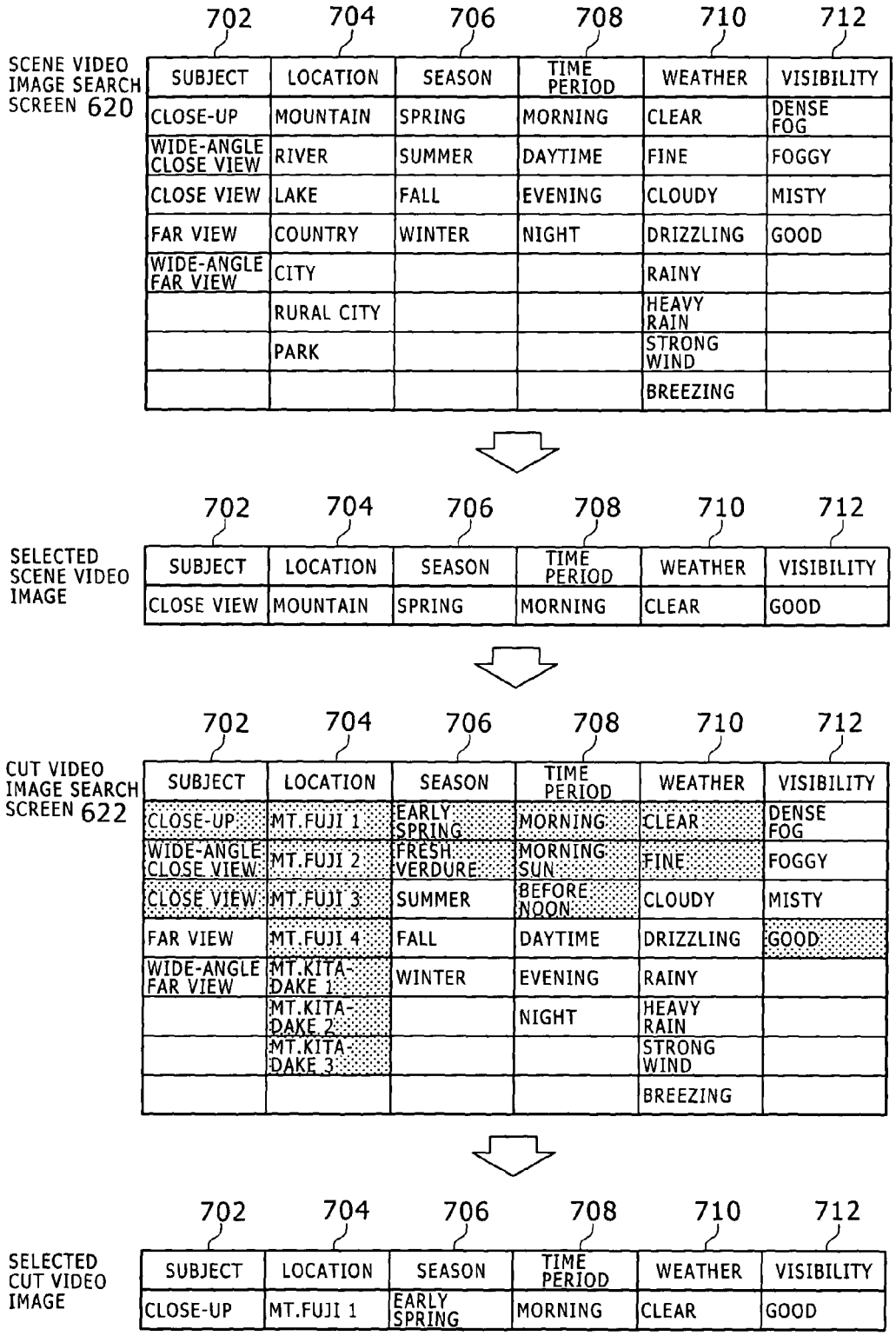
FIG. 18 is a diagram illustrating exemplary screens that the information processing apparatus according to the embodiment causes a display unit to display.

Next, with reference to FIG. 18, a method for generating the shooting plan information by use of the information processing apparatus 402 according to the present embodiment will now be described. FIG. 18 illustrates exemplary screens that the information processing apparatus 402 causes the display unit 532 to display when generating the shooting plan information. First, the information processing apparatus 402 causes the display unit 532 to display a scene video image search screen 620. The scene video image search screen 620 is a screen for the user to select an attribute of a scene video image. In the scene video image search screen 620, items of "Subject" 702, "Location" 704, "Season" 706, "Time Period" 708, "Weather" 710, and "Visibility" 712 are displayed as attributes of the scene video image. The user selects a desired attribute for each item in accordance with the subject of a scene that he or she desires to shoot. In the example of the figure, the user has selected "Subject is close view, Location is mountain, Season is spring, Time Period is morning, Weather is clear, Visibility is good".

If the selection of each item related to the attributes of the scene video image is performed in the scene video image search screen 620, the information processing apparatus 402 causes the display unit 532 to display a cut video image search screen 622. The cut video image search screen 622 is a screen for the user to select attributes of cut video images that constitute the scene video image. In the cut video image search screen 622, as with the scene video image search screen 620, items "Subject" 702, "Location" 704, "Season" 706, "Time Period" 708, "Weather" 710, and "Visibility" 712 are displayed as attributes of the cut video image. In the cut video image search screen 622, more detailed attributes contained in the attributes selected by the user in the scene video image search screen 620 are displayed. In the example of the figure, attributes included in a shaded area are such more detailed attributes contained in the attributes selected by the user in the scene video image search screen 620. For example, in the case where "spring" has been selected as an attribute of the scene video image, "early spring", "fresh verdure", and the like are displayed in the cut video image search screen 622 as the more detailed attributes contained in "spring". That is, the cut video image search screen 622 is used to allow the user to select more detailed attributes than the scene video image search screen 620. The user selects a desired attribute for each item in accordance with the subject of a cut that he or she desires to shoot. In the example of the figure, the user has selected "Subject is close-up, Location is Mt. Fuji 1, Season is early spring, Time Period is morning, Weather is clear, Visibility is good".

By the above-described operation, the user is able to generate the shooting plan information representing "shooting a close-up video image of Mt. Fuji 1 on a clear morning in early spring with good visibility". Note that "Mt. Fuji 1", "Mt. Fuji 2", and so on can be set, for example, to be "Mt. Fuji 1 as viewed from the direction of Lake Kawaguchi", "Mt. Fuji 2 as viewed from the direction of Numazu", respectively. The user is able to shoot the video images based on the generated shooting plan information.

<On Registration of Edit Information>

Next, with reference to FIGS. 19A and 19B, the attribute information of the edited video image created using the information processing apparatus 402 according to the present embodiment will now be described. FIG. 19A illustrates a combination of the virtual shooting environment information of a plurality of edited video images created from a shot video image obtained by performing a shooting based on the shooting plan information generated in FIG. 18 and the correction parameters used for editing. Reference numeral 720 denotes the attribute information of the shot video image, and the attribute information of "Subject" 702 through "Visibility" 712 shows that the shooting has been performed according to the shooting plan information generated in FIG. 18. In this case, because the shot video image is the desired video image in accordance with the shooting plan, the user is able to use the shot video image for the content to be created without editing the shot video image. Therefore, "E0" that indicates that no editing using the effect correction value is performed is stored in "Editing effect" 714, and "C1" is stored in "Camera Setting" 716 as the camera setting value at the time of shooting. Note that the information processing apparatus 402 is capable of acquiring the camera setting value at the time of shooting from the camera unit 404 with which the shooting has been performed. Alternatively, the user may input the camera setting value to the information processing apparatus 402.

The information processing apparatus 402 recommends the user to register the shot video image and the edited video images besides the creation of the content. For example, the information processing apparatus 402 causes the display unit 532 to automatically display an editing screen for the shot video image and a message encouraging the user to edit and register the video images so that the user register the shot video image and the edited video images.

Reference numeral 722 denotes the attribute information of the edited video images created by editing the shot video image having the attribute information indicated by reference numeral 720 based on the effect correction values E1 to E5 without changing the camera setting value at the time of shooting. The example of the figure shows that editing the shot video image based on the effect correction value E1 results in such a video image as would have been shot on a cloudy day (reference numeral 722*a*); that editing the shot video image based on the effect correction value E2 results in such a video image as would have been shot in the evening (reference numeral 722*b*); that editing the shot video image based on the effect correction value E3 results in such a video image as would have been shot on a cloudy evening (reference numeral 722*c*); that editing the shot video image based on the effect correction value E4 results in such a video image as would have been shot on a cloudy day in a fog (reference numeral 722*d*); and that editing the shot video image based on the effect correction value E5 results in such a video image as would have been shot in the evening of a cloudy day in a fog (reference numeral 722*e*).

As described above, the information processing apparatus 402 is capable of setting not only a shot video image but also an edited video image as the edit target video image. FIG. 19B illustrates a case where the edited video images indicated by reference numeral 722 (reference numerals 722*a* to 722*e*) in FIG. 19A are set as the edit target video image. Reference numeral 724 denotes the edit target video images and the correction parameter (the effect correction value and the camera setting value) used when editing each of the edit target video images. Reference numeral 726 denotes the attributes of an edited video image created by editing the edit target video images indicated by reference numeral 724 using the respective correction parameters.

FIG. 19B shows that in order to restore the edited video image (reference numeral 722a) obtained by editing the shot video image using the effect correction value E1 in FIG. 19A to the original video image having the attributes before editing (i.e., in order to restore the edited video image that looks as if it had been shot on a cloudy day to the original video image shot on a clear day by editing the edited video image), editing should be performed using an effect correction value E6 and a camera setting value C2. Similarly, in order to restore the edited video image (reference numeral 722b) obtained by editing the shot video image using the effect correction value E2 in FIG. 19A to the original video image having the attributes before editing, editing should be performed using an effect correction value E7 and a camera setting value C3. Specifically, in order to restore the edited video image that looks as if it had been shot in the evening to the original video image shot in the morning by editing the edited video image, editing should be performed using an effect correction value E7 and a camera setting value C3. Also, in order to restore the edited video image (reference numeral 722c) obtained by editing the shot video image using the effect correction value E3 in FIG. 19A to the original video image having the attributes before editing, editing should be performed using an effect correction value E8 and a camera setting value C4. Specifically, in order to restore the edited video image that looks as if it had been shot on a cloudy evening to the original video image shot on a clear morning by editing the edited video image, editing should be performed using an effect correction value E8 and a camera setting value C4. Also, in order to restore the edited video image (reference numeral 722d) obtained by editing the shot video image using the effect correction value E4 in FIG. 19A to the original video image having the attributes before editing, editing should be performed using an effect correction value E9 and a camera setting value C5. Specifically, in order to restore the edited video image that looks as if it had been shot on a cloudy day in a fog to the original video image shot on a clear day with good visibility by editing the edited video image, editing should be performed using an effect correction value E9 and a camera setting value C5. Also, in order to restore the edited video image (reference numeral 722e) obtained by editing the shot video image using the effect correction value E5 in FIG. 19A to the original video image having the attributes before editing, editing should be performed using an effect correction value E10 and a camera setting value C6. Specifically, in order to restore the edited video image that looks as if it had been shot in the evening of a cloudy day in a fog to the original video image shot on a clear morning with good visibility by editing the edited video image, editing should be performed using an effect correction value E10 and a camera setting value C6.

By storing the above-described information as the edit information, the information processing apparatus 402 is capable of outputting the shooting assistance information, which will now be described below.

<On Shooting Assistance Information>

Next, with reference to FIG. 20, the shooting assistance information will now be described. First, the user uses the information processing apparatus 402 to create the shooting plan in the procedure that has been described above with reference to FIG. 18. Then, in accordance with an input by the user, the information processing apparatus 402 generates shooting plan information 802. When the shooting plan information 802 has been generated, the information processing apparatus 402 may cause the display unit 532 to display a sample content 804 as a preview. Specifically, in the case where "Location" 704 of the shooting plan information is "Mt. Yotei" as in the example of the figure, if a video image of Mt. Yotei is stored in the edit information storage section 520, the information processing apparatus 402 displays that video image as the preview. In the case where no video image of Mt. Yotei is stored in the edit information storage section 520, if a video image of Mt. Fuji 1, which belongs to "Mountain" in a higher stratum as Mt. Yotei would, is stored in the edit information storage section 520, that video image of Mt. Fuji 1 may be displayed as the preview.

After generating the shooting plan information 802, the information processing apparatus 402 outputs shooting assistance information 806. The destination of the output of the shooting assistance information 806 is, as illustrated in FIG. 14, the external storage medium 406, such as the external memory 406a, the portable display device 406b, the print medium 406c, or the like. The shooting assistance information 806 includes a plurality of pieces of shooting instruction information 808a to 808f (shooting instructions 1 to 6 in the example of the figure). Each piece of shooting instruction information contains situation factors ("Lighting" 700 through "Visibility" 712) at the time of shooting and the correction parameter ("Editing effect" 714 and "Camera Setting" 716) in accordance with the situation factors. A specific description thereof will now be given using the example of the figure. Suppose that despite a shooting plan of "shooting a close-up video image of Mt. Yotei on a clear spring morning with good visibility", the shooting day is in a situation for "shooting a close-up video image of Mt. Yotei on a clear summer morning with good visibility and front lighting". In this case, by referring to the shooting instruction 1, the user carries out a shooting in that situation using the camera setting value C1 and edits a video image obtained by the shooting using the effect correction value E0 (e.g., no effect correction), whereby a desired video image according to the shooting plan will be obtained. Similarly, in the case where the shooting day is in a situation for "shooting a close-up video image of Mt. Yotei during the daytime on a drizzling and misty summer day with front lighting", the user, by referring to the shooting instruction 6, carries out a shooting in that situation using the camera setting value C6 and edits a video image obtained by the shooting using the effect correction value E5, whereby the desired video image according to the shooting plan will be obtained.

The information processing apparatus 402 outputs the shooting assistance information 806 as described above. As a result, even if the shooting day does not satisfy the shooting environment of the shooting plan, the user is able to easily obtain the desired video image by referring to the shooting instruction information contained in the shooting assistance information 806 and performing a shooting and an edition in accordance with the instruction thereof.

Figure 21:
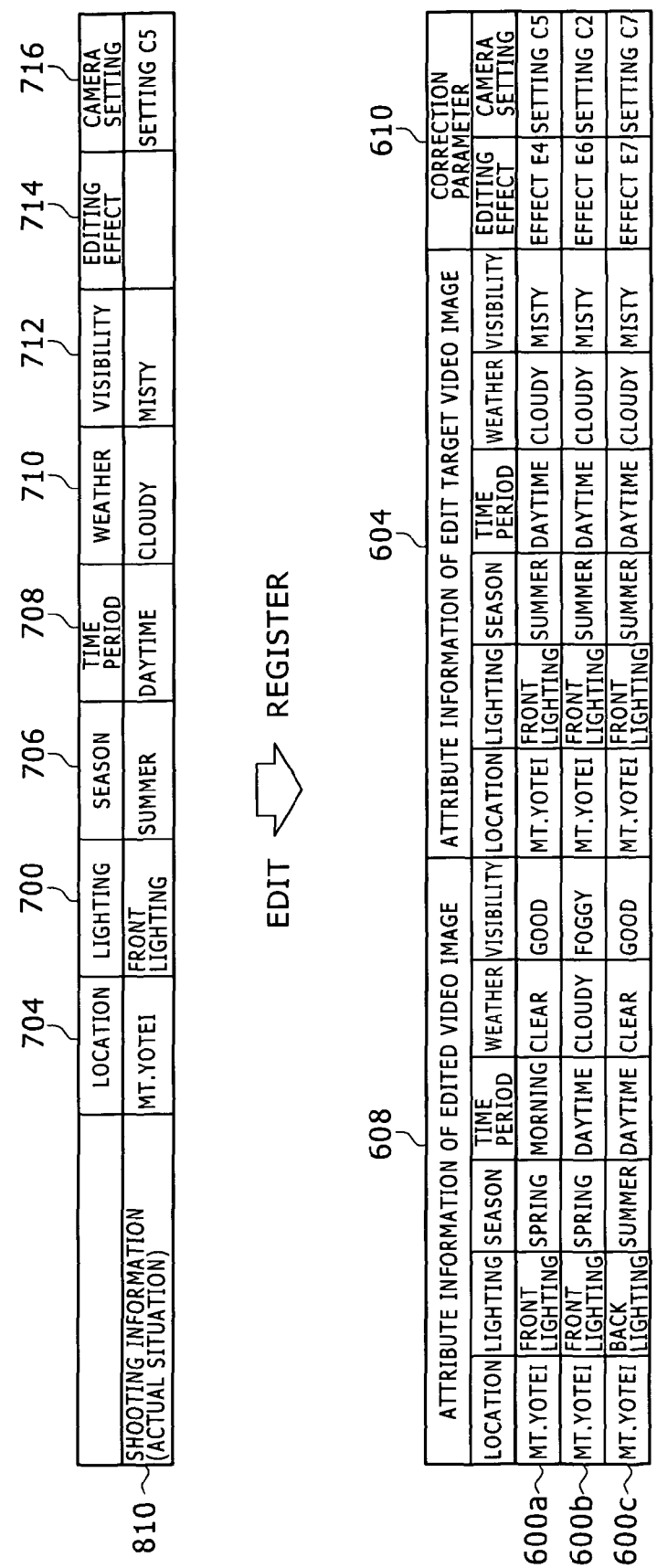
FIG. 21 is a diagram illustrating the edit information in the embodiment.

From the video image obtained by the shooting, a plurality of edited video images are created, and a plurality of pieces of edit information are generated in accordance with the respective edited video images and, as illustrated in FIG. 21, are registered in the edit information storage section 520 to be available for a next shooting plan.

<Procedure for Creating Content>

Figure 22:
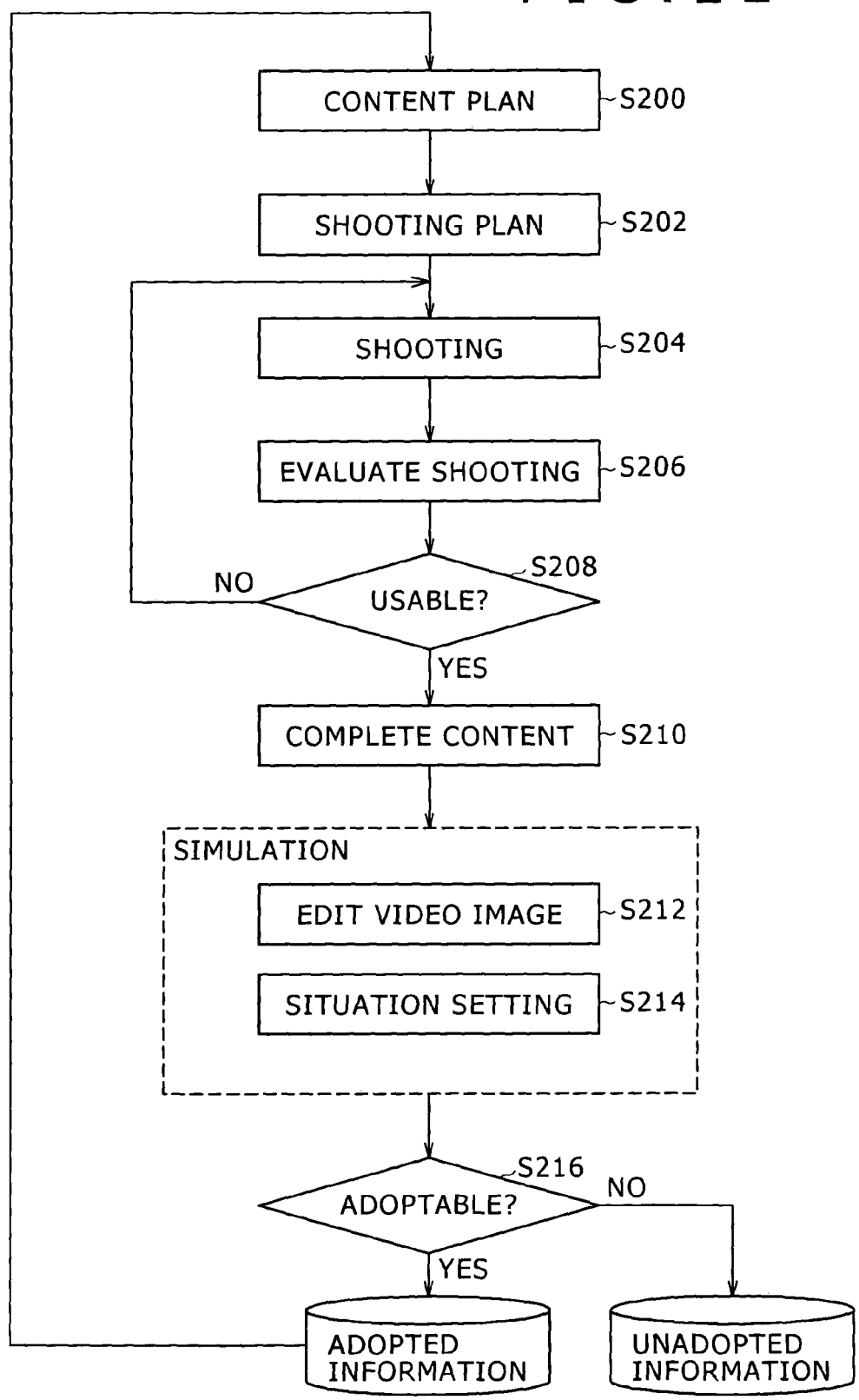
FIG. 22 is a flowchart illustrating a procedure for creating the content using the information processing apparatus according to the embodiment.

Next, with reference to FIG. 22, a procedure for creating the content using the information processing apparatus 402 according to the present embodiment will now be described. First, the user designs the content plan in accordance with the subject of the content that the user desires to create (S200). At this stage, the structure of scenes, the arrangement of cuts, and the like are determined. Next, the user designs the shooting plan (S202). At this stage, the information processing apparatus 402 generates the shooting plan information. After designing the shooting plan, the user carries out the shooting of the video image based on the shooting plan (S204). Then, the user evaluates the video image obtained by the shooting (S206), and determines whether the video image is usable for the content (S208). If the user determines that the video image is not usable because it is out of focus or blurred, for example, a shooting is carried out again. Meanwhile, if the user determines that the video image is usable, the user completes the content using the video image obtained by the shooting (S210).

Next, the user runs a simulation using the information processing apparatus 402. Specifically, the user edits the video image obtained by the shooting using various correction parameters (S212), and performs a situation setting for resultant edited video images (S214). The situation setting includes setting the attributes, and especially the virtual shooting environment information, of the edited video images. Then, the user determines whether the edited video images can be adopted (S216). Specifically, if one of the edited video images is too dark as a result of editing, for example, that edited video image is determined to be unadoptable. Then, a video image that has been determined to be adoptable and the attribute information thereof and a video image that has been determined to be unadoptable and the attribute information thereof are stored in different databases. The video image that has been determined to be adoptable and the attribute information thereof are stored in the edit information storage section 520 as described above. The information that has been determined to be adoptable will be used when a next content is created. Storing the video image that has been determined to be unadoptable in a database makes it possible to employ the video image for the determination of usability at step S208. For example, if the video image obtained by the shooting at step S204 resembles a video image stored in the database for the storage of the unadoptable information, the user is able to determine that the video image obtained by the shooting is not usable.

<Information Processing Method Employed When Generating Edit Information>

Figure 23:
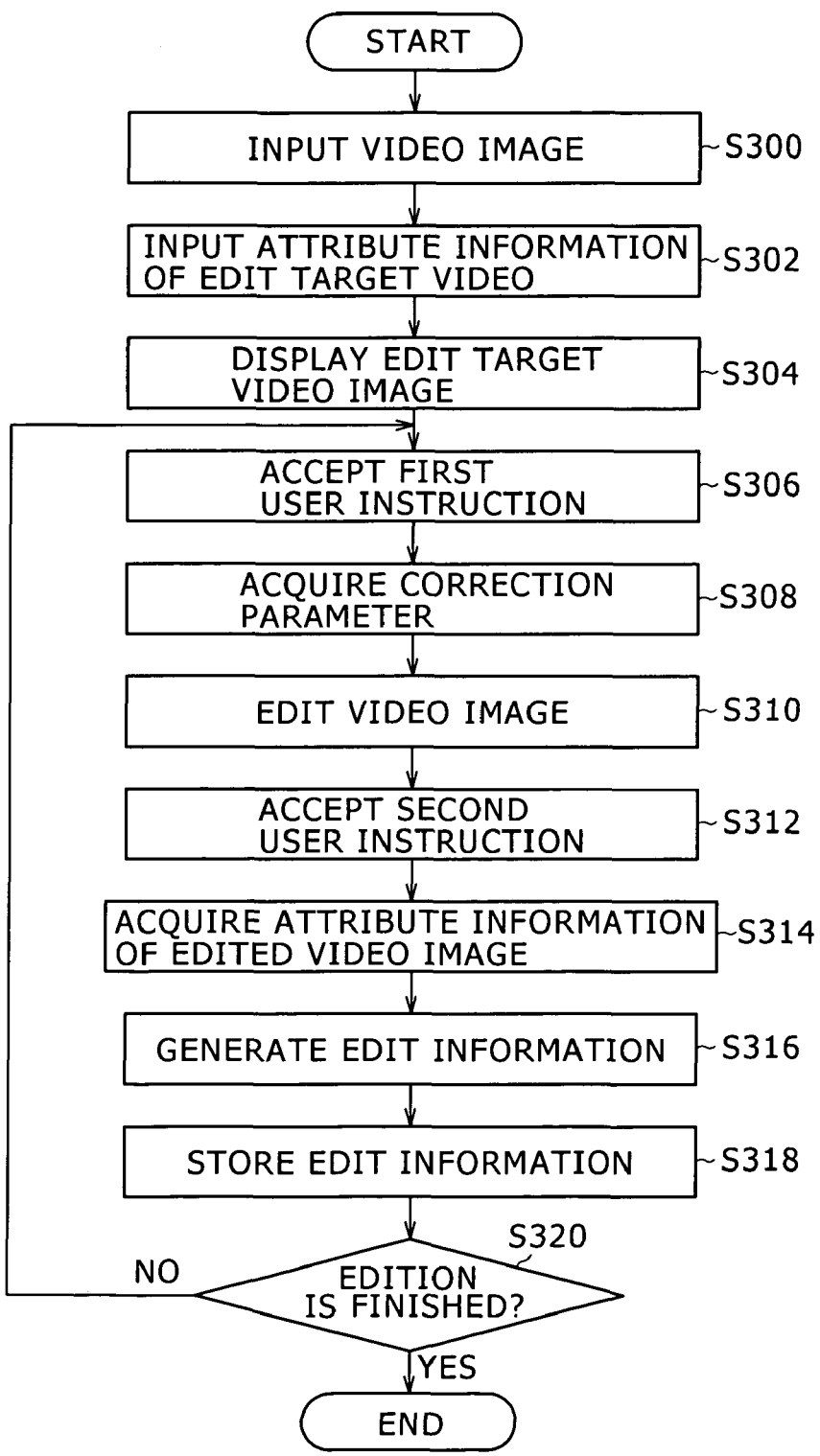
FIG. 23 is a flowchart illustrating a method of information processing performed by the information processing apparatus according to the embodiment for generating the edit information.

Next, with reference to FIG. 23, a method of information processing performed when the information processing apparatus 402 generates the edit information will now be described. First, the edit target video image is inputted to the information processing apparatus 402 (S300). Next, the attribute information related to the edit target video image is inputted to the information processing apparatus 402 (S302). The information processing apparatus 402 causes the display unit 532 to display the video image inputted at step S300 (S304).

Then, the information processing apparatus 402 accepts a first user instruction (S306). The first user instruction is an instruction to edit the video image displayed on the display unit 532. Upon receipt of the first user instruction, the information processing apparatus 402 acquires the correction parameter (S308). After acquiring the correction parameter, the information processing apparatus 402 edits the video image inputted at step S300 based on the acquired correction parameter (S310). Next, the information processing apparatus 402 accepts a second user instruction (S312). The second user instruction refers to an input of the attribute related to the edited video image obtained at step S310. Upon receipt of the second user instruction, the information processing apparatus 402 acquires the attribute information of the edited video image (S314).

Thereafter, the information processing apparatus 402 generates the edit information using the video image inputted at step S300, the attribute information of the edit target video image inputted at step S302, the correction parameter acquired at step S308, the edited video image obtained at step S310, and the attribute information of the edited video image obtained at step S314 (S316). Then, the information processing apparatus 402 stores the edit information generated at step S316 in the edit information storage section 520 (S318). Thereafter, until receipt of an instruction by the user to finish editing, the information processing apparatus 402 repeats the processes of steps S306 to S318. According to the above-described processing method, the information processing apparatus 402 generates a plurality of pieces of edit information.

<Information Processing Method Employed When Outputting Shooting Assistance Information>

Figure 24:
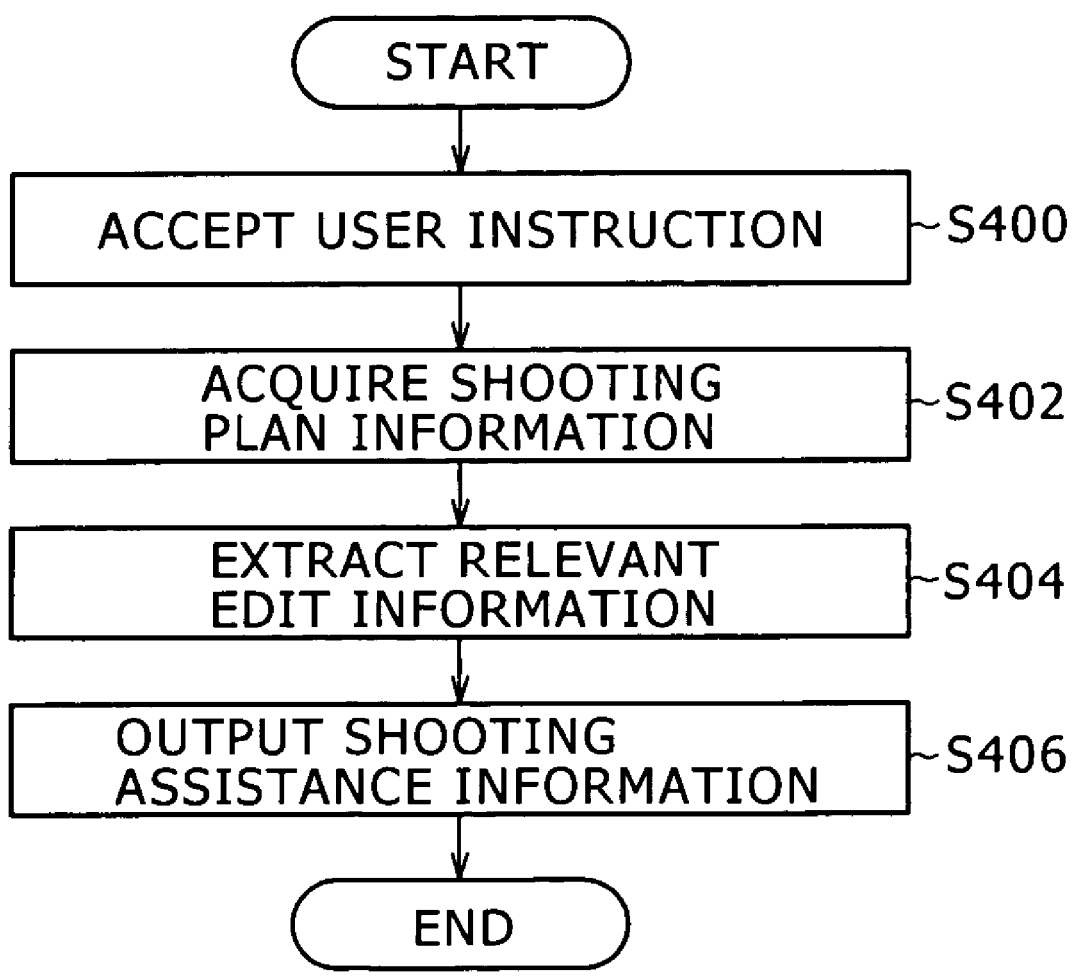
FIG. 24 is a flowchart illustrating a method of information processing performed by the information processing apparatus according to the embodiment for outputting the shooting assistance information.

Next, with reference to FIG. 24, a method of information processing performed when the information processing apparatus 402 outputs the shooting assistance information will now be described. First, the information processing apparatus 402 accepts a user instruction (S400). This user instruction refers to an input of the shooting plan information. Upon receipt of the user instruction, the information processing apparatus 402 acquires the shooting plan information (S402). Then, based on the acquired shooting plan information, the information processing apparatus 402 searches the edit information storage section 520 in which the edit information is stored and extracts relevant edit information therefrom (S404). After extracting the relevant edit information, based on the extracted edit information, the information processing apparatus 402 outputs the shooting assistance information to the external storage medium (S406). According to the above-described processing method, the information processing apparatus 402 outputs the shooting assistance information.

As described above, the information processing apparatus 402 according to the present embodiment creates, from a single video image obtained by shooting, a plurality of edited video images and registers them in the database. Therefore, it is possible to create, from a single shooting operation, a plurality of video images usable when creating the sample content during a content planning. Further, registering each of the video images in the database so as to be associated with the attribute information thereof makes it possible to create the sample content while selecting the attributes thereof, making it possible to add, to the sample content, a video image that is suited to the subject of the desired content. Still further, registering the attribute information of the edited video images, the attribute information of the edit target video image, and the correction parameter used for edition in the database so as to be associated with one another makes it possible to output the shooting assistance information that provides to the user a guide to obtaining a desired video image by an appropriate camera setting at the time of shooting and an appropriate editing of a shot video image even if the shooting day does not provide a situation that accords with the shooting plan. Therefore, despite lack of experience in the shooting and editing of video images, the above-described information processing apparatus 402 makes it possible to easily obtain the desired video image.

Note that the description of the above-described embodiment has illustrated the case where the content creation apparatus 100 that creates the sample content and the information processing apparatus 402 that creates the video-image materials and the attribute information thereof are separate apparatuses. However, a single device (a computer) may implement the functions of both the content creation apparatus 100 and the information processing apparatus 402.

The preferred embodiment of the present invention has been described above with reference to the accompanying drawings. However, it should be understood that the present invention is not limited to this exemplary embodiment. It is obvious that those skilled in the art can devise numerous other variations and modifications without departing from the scope of the appended claims or equivalents thereof. It should be understood that such variations and modifications are also included within the scope of the present invention.

What is claimed is:

1. An information processing apparatus, comprising:
   an image input section configured to input an edit target image;
   an edit target image attribute input section configured to input first attribute information of the edit target image, the first attribute information being independent from camera setting information used to capture the edit target image and including shooting environment information that indicates an environment of a shooting location when the edit target image was shot, including at least one of location information, weather information, and season information;
   a display control section configured to display the edit target image on a display screen;
   a user instruction input section configured to input an instruction from a user;
   a correction parameter acquisition section configured to acquire, from said user instruction input section, a correction parameter for editing the edit target image;
   an image editing section configured to edit the edit target image displayed on the display screen in accordance with the correction parameter to create an edited image;
   an edited image attribute acquisition section configured to acquire, from said user instruction input section, second attribute information of the edited image created by said image editing section by editing the edit target image;
   an edit information generation section configured to associate the first attribute information of the edit target image, the second attribute information of the edited image, and the correction parameter with one another to generate edit information; and
   an edit information storage section configured to store the edit information such that the edit information can be later extracted for use in a shooting plan when the edit information includes second attribute information that corresponds to desired shooting environment information included in the shooting plan.

2. The information processing apparatus according to claim 1, wherein the edit information generation section is configured to generate edit information including the edit target image and the edited image.

3. The information processing apparatus according to claim 1, wherein the edit target image is an image obtained by carrying out a shooting using a camera device.

4. The information processing apparatus according to claim 3, wherein the correction parameter includes a setting value of the camera device.

5. The information processing apparatus according to claim 1, wherein
   the edited image attribute acquisition section is configured to input the second attribute information of the edited image including virtual shooting environment information that indicates a virtual shooting environment of the edited image, the virtual shooting environment information being inputted to said user instruction input section.

6. The information processing apparatus according to claim 5, wherein
   the edit target image attribute input section is configured to input the shooting environment information including at least one of the location information, the weather information, the season information, and time period information, and
   the edited image attribute acquisition section is configured to input the virtual shooting environment information including at least one of location information, weather information, season information, and time period information.

7. The information processing apparatus according to claim 6, wherein the second attribute information input to the edit image attribute section and stored in the edit information storage section includes the virtual shooting environment information that indicates the location information of the virtual shooting location.

8. The information processing apparatus according to claim 6, wherein the second attribute information input to the edit image attribute section and stored in the edit information storage section includes the virtual shooting environment information that indicates the weather information of the virtual shooting location.

9. The information processing apparatus according to claim 6, wherein the second attribute information input to the edit image attribute section and stored in the edit information storage section includes the virtual shooting environment information that indicates the season information of the virtual shooting location.

10. The information processing apparatus according to claim 5, further comprising:
    a shooting plan information acquisition section configured to acquire, from said user instruction input section, shooting plan information including desired shooting environment information that indicates a desired environment of a shooting location;
    an edit information extraction section configured to extract, from said edit information storage section, the edit information, the second attribute information of the edited image within the edit information containing the virtual shooting environment information that corresponds to the desired shooting environment information; and
    a shooting assistance information output section configured to output, to an outside of the information processing apparatus, shooting assistance information that includes a combination of the shooting environment information and the correction parameter contained in the edit information extracted by said edit information extraction section.

11. The information processing apparatus according to claim 10, wherein the shooting plan information acquisition section is configured to acquire the desired shooting environment information including at least one of location information, weather information, season information, time period information, and visibility state information.

12. The information processing apparatus according to claim 5, wherein
    the edit target image attribute input section is configured to input the shooting environment information including visibility state information, and
    the edited image attribute acquisition section is configured to input the virtual shooting environment information including visibility state information.

13. The information processing apparatus according to claim 1, wherein the edit target image is a moving image.

14. The information processing apparatus according to claim 1, wherein the first attribute information input to the edit target image attribute section and stored in the edit information storage section includes the shooting environment information that indicates the location information of the shooting location.

15. The information processing apparatus according to claim 1, wherein the first attribute information input to the edit target image attribute section and stored in the edit information storage section includes the shooting environment information that indicates the weather information of the shooting location.

16. The information processing apparatus according to claim 1, wherein the first attribute information input to the edit target image attribute section and stored in the edit information storage section includes the shooting environment information that indicates the season information of the shooting location.

17. A non-transitory computer readable medium storing a computer program that when executed by a computer, causes the computer to perform a method comprising:
inputting an edit target image;
inputting first attribute information of the edit target image, the first attribute information being independent from camera setting information used to capture the edit target image and including shooting environment information that indicates an environment of a shooting location when the edit target image was shot, including at least one of location information, weather information, and season information;
providing the edit target image to the computer program;
acquiring, from the computer program, a correction parameter used for editing the edit target image;
accepting an instruction from a user;
acquiring second attribute information, through the process of accepting the instruction from the user, of an edited image created by the computer program by editing the edit target image;
associating the second attribute information of the edit target image, the first attribute information of the edited image, and the correction parameter with one another to generate edit information; and
storing the edit information in an edit information storage section such that the edit information can be later extracted for use in a shooting plan when the edit information includes second attribute information that corresponds to desired shooting environment information included in the shooting plan.

18. The non-transitory computer readable medium according to claim 17, wherein the method further comprises:
changing the correction parameter in accordance with a type of the computer program, the correction parameter having been acquired from the computer program by the process of acquiring the correction parameter.

19. An information processing method employed by a computer, the method comprising:
inputting an edit target image;
inputting first attribute information of the edit target image, the first attribute information being independent from camera setting information used to capture the edit target image and including shooting environment information that indicates an environment of a shooting location when the edit target image was shot, including at least one of location information, weather information, and season information;
displaying the edit target image on a display screen;
accepting a first instruction from a user;
acquiring a correction parameter for editing the edit target image based on the first instruction;
editing the edit target image displayed on the display screen in accordance with the correction parameter to create an edited image;
accepting a second instruction from the user;
acquiring second attribute information of the edited image created by editing the edit target image based on the second instruction;
associating the second attribute information of the edit target image, the first attribute information of the edited image, and the correction parameter with one another to generate edit information; and
storing the edit information in an edit information storage section such that the edit information can be later extracted for use in a shooting plan when the edit information includes second attribute information that corresponds to desired shooting environment information included in the shooting plan.

20. The information processing method according to claim 19, for the edit target image, the method performing, a plurality of times, the steps of:
accepting the first instruction from the user;
acquiring the correction parameter;
editing the edit target image;
accepting the second instruction from the user;
acquiring second attribute information of the edited image;
generating the edit information; and
storing the edit information.

* * * * *